US011097282B2

(12) United States Patent
Hall et al.

(10) Patent No.: US 11,097,282 B2
(45) Date of Patent: Aug. 24, 2021

(54) APPARATUS, METHOD AND SYSTEM FOR WET OR DRY PROCESSING OF PLANT MATERIAL

(71) Applicant: 1167586 B.C. Ltd., Vancouver (CA)

(72) Inventors: Peter Ryan Hall, Vancouver (CA); Dmytro Kolesnyk, Vancouver (CA)

( * ) Notice: Subject to any disclaimer, the term of this patent is extended or adjusted under 35 U.S.C. 154(b) by 133 days.

(21) Appl. No.: 16/016,441

(22) Filed: Jun. 22, 2018

(65) Prior Publication Data

US 2019/0388902 A1    Dec. 26, 2019

(51) Int. Cl.

| | |
|---|---|
| *B02C 23/18* | (2006.01) |
| *B02C 23/20* | (2006.01) |
| *B02C 18/06* | (2006.01) |
| *A23N 15/02* | (2006.01) |
| *B02C 25/00* | (2006.01) |
| *B02C 18/16* | (2006.01) |

(52) U.S. Cl.
CPC ............ *B02C 23/18* (2013.01); *A23N 15/02* (2013.01); *B02C 18/062* (2013.01); *B02C 18/16* (2013.01); *B02C 23/20* (2013.01); *B02C 25/00* (2013.01)

(58) Field of Classification Search
CPC ......... B02C 23/20; B02C 23/18; B02C 18/02; B02C 18/16; B02C 18/062; B02C 25/00; A23N 15/02
USPC ..................................................... 241/74, 91
See application file for complete search history.

(56) References Cited

U.S. PATENT DOCUMENTS

| | | | | |
|---|---|---|---|---|
| 1,103,305 | A * | 7/1914 | Lilliston ................ | A01D 45/10 460/135 |
| 1,336,991 | A * | 4/1920 | Urschel .................. | A23N 15/12 99/636 |
| 1,512,516 | A * | 10/1924 | Otto ...................... | B02C 17/002 241/91 |
| 2,834,553 | A * | 5/1958 | Neely .................... | B02C 17/002 241/81 |
| 3,233,836 | A * | 2/1966 | Merges .................... | B07B 1/24 241/60 |
| 3,585,758 | A * | 6/1971 | Harper .................... | B24C 3/266 451/85 |
| 3,756,517 | A * | 9/1973 | Hoch .................... | A01F 29/095 241/56 |
| 3,848,815 | A * | 11/1974 | Carpenter, Jr. .......... | B22C 5/02 241/74 |
| 3,931,937 | A * | 1/1976 | Hahn .................... | B02C 17/002 241/74 |
| 4,009,834 | A * | 3/1977 | Hahn .................... | B02C 17/002 241/27 |

(Continued)

Primary Examiner — Faye Francis

(57) ABSTRACT

An apparatus, method and system for wet or dry processing of plant material is provided. The apparatus has an enclosure attached to a frame. The apparatus includes: (a) a cylindrical rotatable drum for receiving the plant material, the rotatable drum having a plurality of slots; (b) a cutting module for cutting portions of the plant material that pass through one or more said slots; and (c) a plurality of nozzles for ejecting a liquid within the enclosure.

The apparatus may further include a controller having a processing unit and a memory, the memory containing instructions for directing the processing unit. The controller may be operable to selectably control operations of the rotatable drum, the cutting module, and the plurality of nozzles.

The cutting module may include a plurality of cutting reels. The cutting module and the rotatable drum may be coaxial. The cutting module may include a plurality of blades rotatable about the drum.

16 Claims, 37 Drawing Sheets

(56) References Cited

U.S. PATENT DOCUMENTS

| | | | | |
|---|---|---|---|---|
| 4,440,637 A * | 4/1984 | Smit | ............. | B07B 13/16 |
| | | | | 209/241 |
| 4,635,860 A * | 1/1987 | Kruyer | ............. | B02C 17/02 |
| | | | | 208/390 |
| 5,108,584 A * | 4/1992 | Brosseuk | ............. | B03B 5/26 |
| | | | | 209/270 |
| 5,495,796 A * | 3/1996 | Mueller | ............. | A23N 17/008 |
| | | | | 99/567 |
| 5,875,979 A * | 3/1999 | Walters | ............. | B02C 17/007 |
| | | | | 241/299 |
| 6,220,534 B1 * | 4/2001 | Kratochwill | ............. | B02C 17/02 |
| | | | | 241/21 |
| 6,325,311 B1 * | 12/2001 | Preisser | ............. | B07B 1/22 |
| | | | | 241/74 |
| 7,712,691 B2 * | 5/2010 | Sharp | ............. | B02C 17/002 |
| | | | | 241/65 |
| 7,942,354 B2 * | 5/2011 | Didion | ............. | B02C 17/183 |
| | | | | 241/74 |
| 8,127,668 B2 * | 3/2012 | Snyder, Jr. | ............. | A23N 15/025 |
| | | | | 99/636 |
| 8,245,962 B2 * | 8/2012 | Didion | ............. | B02C 17/06 |
| | | | | 241/74 |
| 8,757,524 B2 * | 6/2014 | Mosman | ............. | A01G 3/00 |
| | | | | 241/30 |
| 8,789,780 B2 * | 7/2014 | Brosseuk | ............. | B02C 23/16 |
| | | | | 241/74 |
| 9,080,315 B2 * | 7/2015 | Jonninen | ............. | B02C 18/142 |
| 9,161,566 B2 * | 10/2015 | Hall | ............. | B26D 1/36 |
| 9,370,780 B2 * | 6/2016 | Nolan | ............. | B07B 1/20 |
| 9,636,838 B2 * | 5/2017 | Evans | ............. | B26D 7/2614 |
| 10,842,080 B2 * | 11/2020 | Ingram | ............. | A01G 3/00 |
| 10,857,542 B2 * | 12/2020 | Ingram | ............. | A01G 3/00 |
| 2004/0056128 A1 * | 3/2004 | Uebayashi | ............. | B02C 18/062 |
| | | | | 241/74 |
| 2013/0175372 A1 * | 7/2013 | Mosman | ............. | A01G 3/002 |
| | | | | 241/25 |
| 2014/0196587 A1 * | 7/2014 | Beyerlein | ............. | A01G 3/08 |
| | | | | 83/312 |

* cited by examiner

APPARATUS, METHOD AND SYSTEM FOR WET OR DRY PROCESSING OF PLANT MATERIAL

BACKGROUND OF THE INVENTION

1. Field of Invention

This invention relates to removing extraneous plant matter from plant material and, in particular, to wet or dry processing of harvested plants such as herbs, berries, *cannabis*, and other medicinal or non-medicinal crops.

2. Description of Related Art

Plant processors are used to process plants, such as *cannabis*, by removing extraneous plant matter, including dirt and debris, from harvested plant material.

U.S. Pat. No. 9,161,566 to Hall discloses a plant processor having: (a) a rotatable drum for receiving plant matter, the rotatable drum having a plurality of slots; (b) a rotatable cutting reel positioned below the rotatable drum; (c) a cutting knife horizontally positioned below the top of the cutting reel; and (d) a motor to rotate a shaft secured to the cutting reel, the shaft having a groove to frictionally engage a ring that supports the drum, whereby rotation of the cutting reel rotates the drum in the opposite direction.

The plant processor of Hall also provides a slight tilt to one side relative to the surface the plant processor is placed on, so that plant material that is fed in to the rotating drum at a first, elevated side is drawn toward the opposite, lower side.

However, the plant processor of Hall is limited to providing a fixed ratio of cutting reel rotational speed to drum rotational speed, a fixed distance between the drum and the cutting reel, cutting action along a single contact line between the drum and the cutting reel, cutting action at any given time at a single sharpness of cutting, movement of plant material through the slots by force of gravity only, removal of the cutting reel by unfastening it with tools from a frame of the plant processor, and limited to providing a fixed angle of tilt. Furthermore, cleaning internal components of the plant processor of Hall requires partial disassembly of the apparatus, which is time-consuming.

Conventional plant processors can sequentially process different batches of plant material, in which the particular plant, or strain of a given plant, may vary from batch to batch. It is desirable to clean a plant processor between batches to remove gummy, fibrous buildup on components of the plant processor. Such cleaning conventionally involves at least partial disassembly of the plant processor and then hand cleaning by scrubbing and scraping internal components of the plant processor in the presence of harsh chemical-cleaning agents. Alternatively, conventional cleaning may proceed by partial disassembly of the plant processor and then subjecting the internal components of the plant processor to pressure washing by a hand-held pressure washer.

However, such conventional cleaning methods involve strenuous manual labor and necessitate the shutdown of plant processing, such as between batches, for significant lengths of time.

An object of the invention is to address the above shortcomings.

SUMMARY

The above shortcomings may be addressed by providing, in accordance with one aspect of the invention, an apparatus for processing plant material, the apparatus having an enclosure attached to a frame. The apparatus includes: (a) a cylindrical rotatable drum for receiving the plant material, the rotatable drum having a plurality of slots; (b) a cutting module for cutting portions of the plant material that pass through one or more of the slots; and (c) a plurality of nozzles for ejecting a liquid within the enclosure.

The apparatus may further include a controller having a processing unit and a memory, the memory containing instructions for directing the processing unit. The controller may be operable to selectably control operations of the rotatable drum, the cutting module, and the plurality of nozzles. The enclosure may include a shroud that is removably attachable to the frame by at least one shroud magnet of the apparatus. The plurality of nozzles may be operable to eject the liquid from within the rotatable drum. The plurality of nozzles may be operable to eject the liquid toward the rotatable drum from outside of the rotatable drum. The cutting module may include a plurality of cutting reels. The cutting module may be slidably attachable to the frame. The distance between the rotatable drum and the cutting module may be adjustable by adjusting a height of the rotatable drum. The cutting module and the rotatable drum may be coaxial. The cutting module may include a plurality of blades rotatable about the drum. The apparatus may further include a pair of parallel, spaced-apart rings circumscribing the rotatable drum. The plurality of blades may be removably attachable to the pair of rings by a plurality of ring magnets. The apparatus may further include a plurality of rods extending between the pair of rings. Each of the blades may be removably attachable to a corresponding one of the rods by at least one rod magnet. The cutting module may include a plurality of cutting members. The cutting module may include a cutting-module motor for moving the plurality of cutting members. The plurality of cutting reels may define a plurality of cutting interfaces between the cutting reels and the drum. The cutting interfaces may extend along a plurality of parallel, spaced-apart axes. Each of the axes may extend between first and second ends of the drum. The cutting-module motor may be a cutting-reel motor for rotating one or more of the cutting reels. The cutting module and the rotatable drum may be coaxial. The cutting module may include a plurality of rings circumscribing the drum. The cutting-module motor may be a ring motor for rotating the plurality of rings. The blades may extend between a pair of the rings parallel and spaced-apart. The apparatus may include a drum motor for rotating the drum. The drum motor may include an output shaft rotatably coupled to the drum. The controller may be operable to independently energize the drum motor and the cutting-module motor. The controller may be operable to energize the drum motor to rotate the drum at a first speed in a first direction. The controller may be operable to energize the cutting-module motor to rotate the plurality of cutting members at the first or a second speed in the first or a second direction. The plurality of nozzles may be dimensioned to eject the liquid at high-pressure. The plurality of nozzles may be operable to eject the liquid at high-pressure. The plurality of nozzles may be operable to eject the liquid at a pressure in the range of 1750 PSI (12066 kPa) to 2500 PSI (17237 kPa). The nozzles may be operable to eject the liquid at warm to hot temperatures. The nozzles may be operable to eject the liquid at a temperature in the range of 150 degrees Fahrenheit (66 degrees Celsius) to 200 degrees Fahrenheit (93 degrees Celsius). The apparatus may include an inlet for receiving the liquid. The inlet may be operable to receive the liquid at high-pressure. The inlet may be operable to receive the liquid at a pressure in the range of 1750 PSI (12066 kPa) to 2500 PSI (17237 kPa). The inlet may be operable to receive the liquid at warm to hot temperatures. The inlet may be operable to receive the liquid at a temperature in the range of 150 degrees Fahrenheit (66 degrees Celsius) to 200 degrees Fahrenheit (93 degrees Celsius).

In accordance with another aspect of the invention, there is provided a method of processing plant material by a plant processor having an enclosure attached to a frame. The method may involve: (a) receiving the plant material into a rotatable drum having a plurality of slots; (b) producing trimmed plant material by a cutting module cutting portions of the plant material that pass through one or more the slots; (c) removing the portions from the enclosure by vacuum suction; (d) after cutting the portions, removing the trimmed plant material from the rotatable drum; and (e) after removing the portions and after removing the trimmed plant material, ejecting a liquid within the enclosure by a plurality of nozzles of the plant processor.

Step (a) may involve receiving the plant material into the rotatable drum at a first end of the rotatable drum. Step (d) may involve removing the trimmed plant material from the rotatable drum at a second end of the rotatable drum opposite the first end. Step (b) may involve cutting the portions by a first set of cutting reels associated with the first end and by a second set of cutting reels associated with the second end, the first set of cutting reels cutting less sharply than the second set of cutting reels. Cutting the portions by a first set of cutting reels associated with the first end and by a second set of cutting reels associated with the second end, the first set of cutting reels cutting less sharply than the second set of cutting reels, may involve operating the first set of cutting reels in reverse. Step (b) may involve setting a first vacuum suction associated with the first end and a second vacuum suction associated with the second end, such that the first vacuum suction is greater than the second vacuum suction for a first duration and then the second vacuum suction is greater than the first vacuum suction for a second duration.

In accordance with another aspect of the invention, there is provided an apparatus for processing plant material, the apparatus having an enclosure attached to a frame. The apparatus includes: (a) cylindrical means for containing the plant material and rotating; (b) exit means for permitting a portion of the plant material to exit the cylindrical means; (c) cutting means for cutting the portion upon exiting via the exit means; and (d) nozzle means for ejecting a liquid within the enclosure.

The apparatus may further include vacuum means for facilitating the exiting of the portion via the exit means. The apparatus may further include feeding means for feeding the plant material into the cylindrical means. The apparatus may further include stabilization means for adjusting a tilt of the apparatus. The apparatus may further include control means for controlling operations of at least one of the cylindrical means, the cutting means, the nozzle means, the vacuum means, the feeding means, and the stabilization means.

Other aspects and features of the present invention will become apparent to those of ordinary skill in the art upon review of the following description of embodiments of the invention in conjunction with the accompanying figures and claims.

BRIEF DESCRIPTION OF THE DRAWINGS

In drawings which illustrate by way of example only embodiments of the invention.

DETAILED DESCRIPTION

An apparatus for processing plant material, the apparatus having an enclosure attached to a frame, includes: (a) cylindrical means for containing the plant material and rotating; (b) exit means for permitting a portion of the plant material to exit the cylindrical means; (c) cutting means for cutting the portion upon exiting via the exit means; and (d) nozzle means for ejecting a liquid within the enclosure. The apparatus may include vacuum means for facilitating the exiting of the portion via the exit means. The apparatus may include feeding means for feeding the plant material into the cylindrical means. The apparatus may include stabilization means for adjusting a tilt of the apparatus. The apparatus may include control means for controlling operations of at least one of the cylindrical means, the cutting means, the nozzle means, the vacuum means, the feeding means, and the stabilization means.

Figure 1:
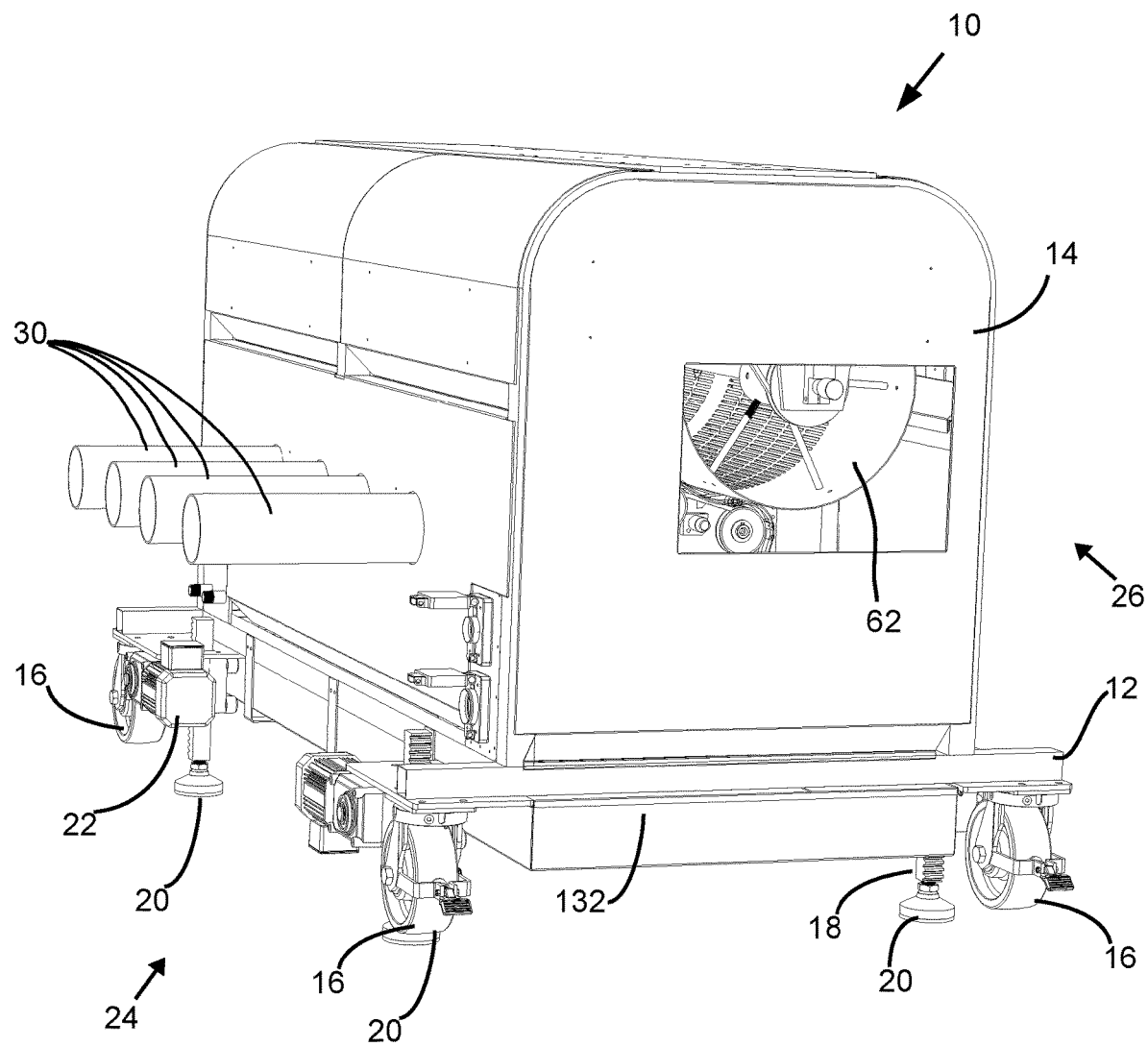
FIG. 1 is a perspective view of an apparatus for processing plant material according to a first embodiment of the invention, showing an infeed end and front side of the apparatus.
Figure 2:
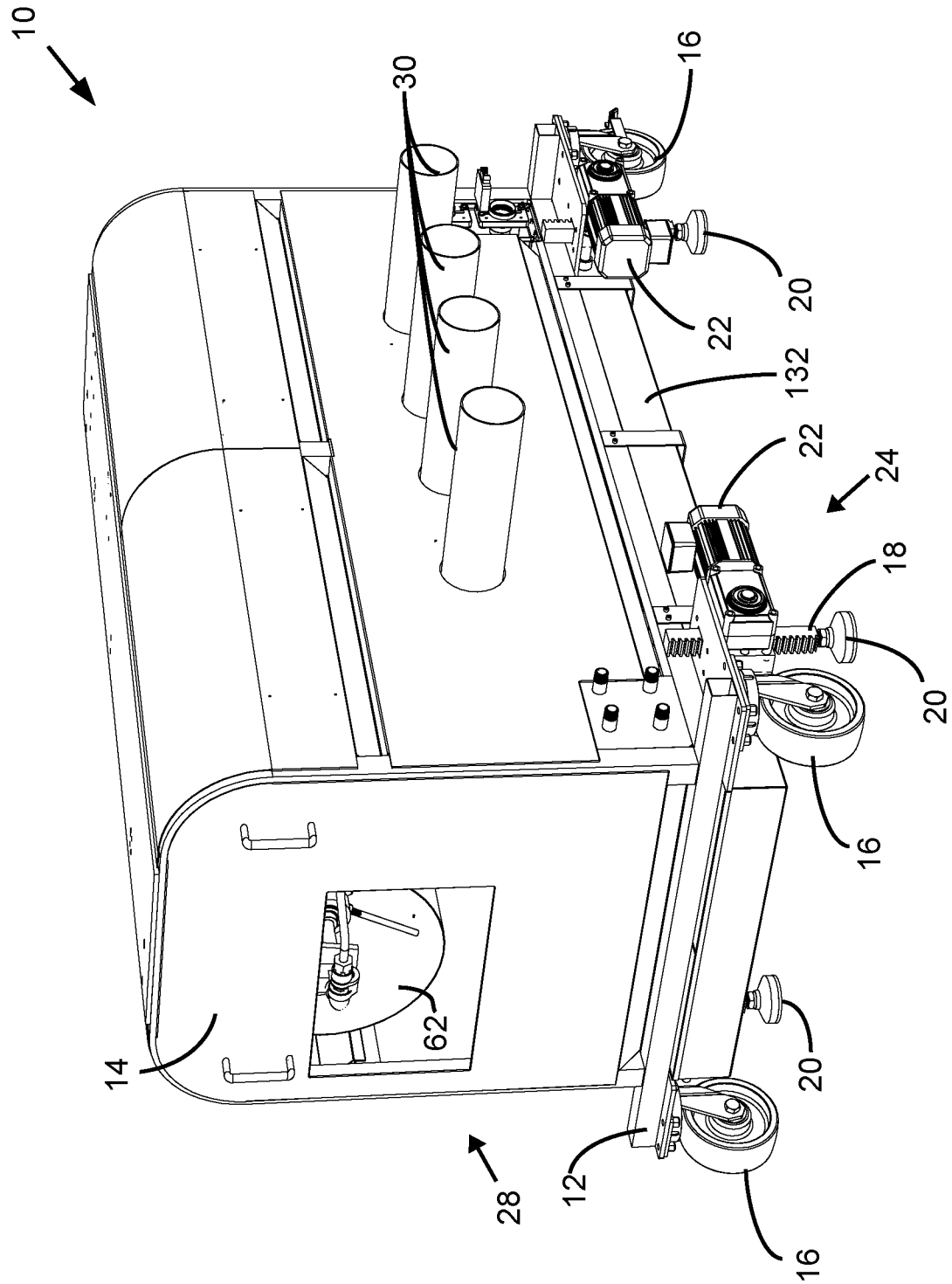
FIG. 2 is a perspective view of the apparatus shown in FIG. 1, showing an outfeed end and front side of the apparatus.

Referring to FIGS. 1 and 2, the apparatus according to a first embodiment of the invention is shown generally at 10. The apparatus 10 processes plant material to separate certain portions of the plant material from the remainder of the plant material. For example, the apparatus 10 may be suitably employed to remove extraneous leaves, stems, dirt, debris or other extractable plant matter from *cannabis* buds.

The apparatus 10 includes a frame 12 and an enclosure 14 attached to the frame 12 for housing internal components of the apparatus 10. The wheels 16 at each corner of the apparatus 10 facilitate moving the apparatus 10 to a desired location, after which the stabilizers 18 are deployed by lowering the foot pads 20 until secure contact is made with the ground surface upon which the apparatus 10 rests. In the first embodiment, the height of each stabilizer 18 is adjusted by operation of its associated stabilizer motor 22 of a stabilizer sub-system 24 described further below. The stabilizer motor 22 may be an electromechanical motor, hydraulic motor, other type of motorized mechanism, or any combination thereof for example.

By adjusting the heights of the stabilizers 18, the apparatus 10 can be given a tilt such that the apparatus 10 is higher at its infeed end 26 (FIG. 1) than its outfeed end 28 (FIG. 2). While FIGS. 1 and 2 show the infeed and outfeed ends 26 and 28 as being particularly identified ends of the apparatus 10, in general the ends 26 and 28 are reversal and either end 26 or 28 can be used for either infeeding or outfeeding, including using the same end 26 or 28 for both infeeding and outfeeding. During processing, separated portions of the plant material exit the apparatus 10 via the outlet ducts 30. After processing the plant material, or continuously while processing the plant material, processed plant material can be removed from the selected outfeed end 28 of the apparatus 10. For example, a container, conveyor or other equipment (not shown) may be placed adjacent to the outfeed end 28 to receive processed plant material being pushed out of the apparatus 10 at the outfeed end 28.

While moveable embodiments of the apparatus of the present invention have been described and illustrated herein, in some embodiments the apparatus may be mounted in a larger immovable frame.

Figure 3:
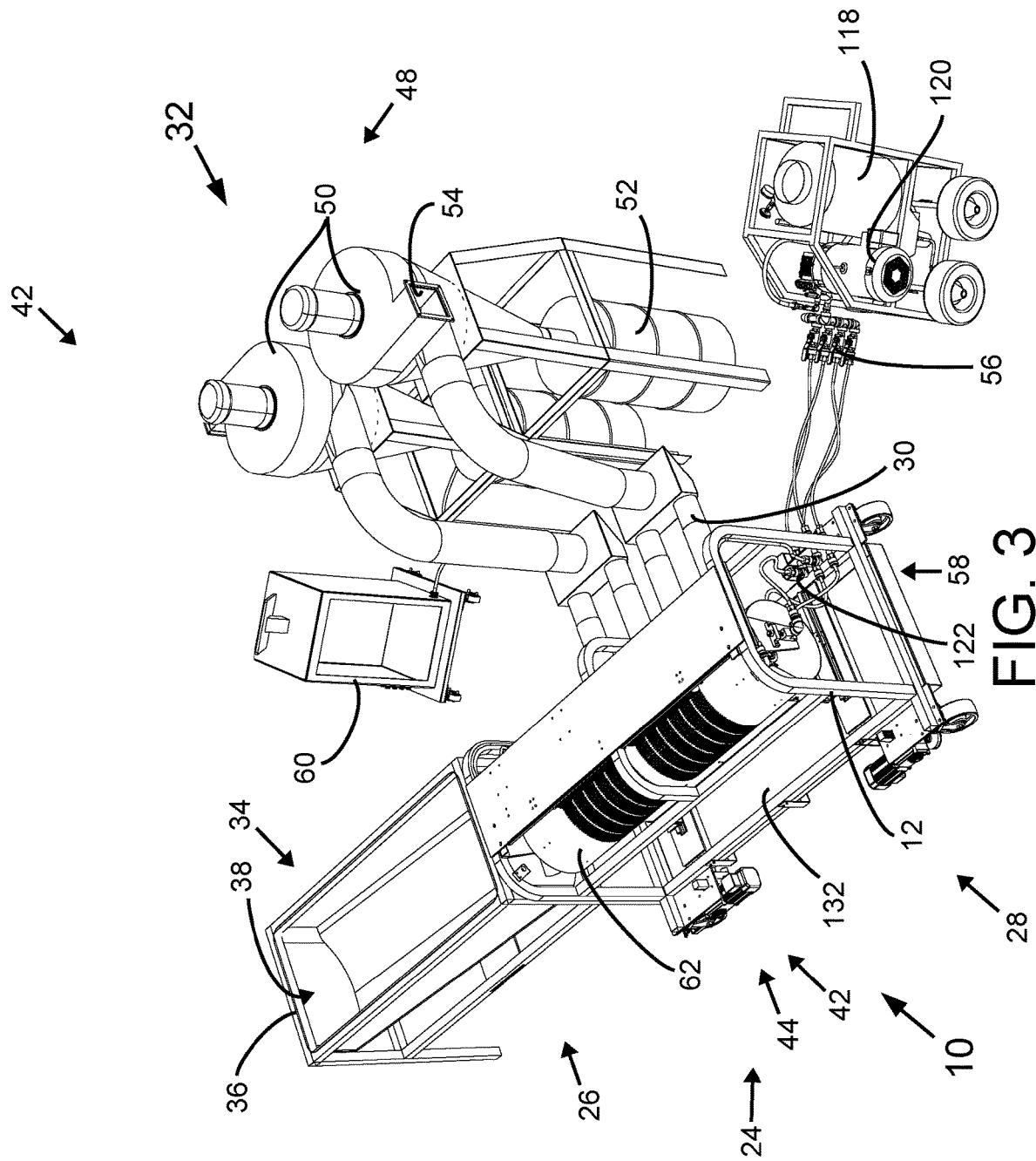
FIG. 3 is a perspective view of a system containing the apparatus shown in FIG. 1 viewed from a first perspective angle.
Figure 4:
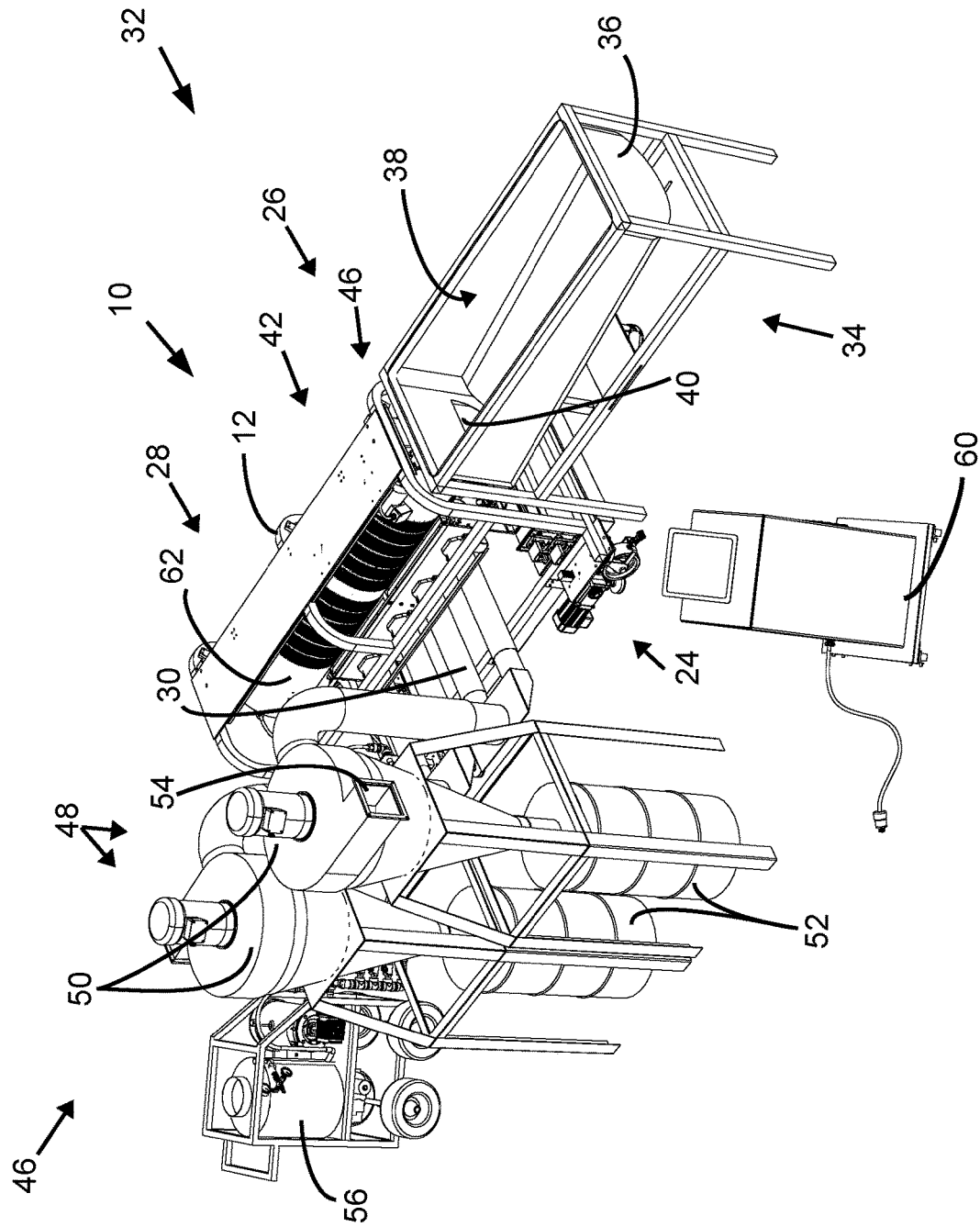
FIG. 4 is a perspective view of the system shown in FIG. 3, showing the system from a second perspective angle.

Referring to FIGS. 3 and 4, the apparatus 10 may be employed within a system 32 for processing plant material. For clarity of illustration, the apparatus 10 is shown in FIGS. 3 and 4 without its enclosure 14.

The system 32 includes a feeding sub-system 34 that includes a feed unit, such as the agitating hopper 36 shown in FIGS. 3 and 4. The hopper 36 abuts the infeed end 26 of the apparatus 10. The hopper 36 includes an open top 38 or other large opening for receiving harvested plant material (not shown), and a hopper outlet 40 for passing the plant material into the apparatus 10. Typically, the hopper 36 has an agitation motor (not visible in the Figures) and has an inner bottom surface that is sloped toward its hopper outlet 40. The rate of agitation may be variable, such as by having a variable-rate hopper motor, to effect a controllably variable rate of entry of the plant material into the apparatus 10.

After the apparatus 10 receives the plant material from the hopper 36, the plant material is processed by a drum sub-system 42 and a cutting sub-system 44 operated in conjunction with a vacuum sub-system 46. The processed plant material becomes available for removal at the outfeed end 28, while the separated portions of the plant material exiting the apparatus 10 via the outlet ducts 30 enter one or more separators 48 of the vacuum sub-system 46. The separators 48 employ a vacuum source, such as the suction air pumps 50 shown in FIGS. 3 and 4, for cyclonic vacuum suction to circulate air, debris and the separated portions of the plant material and to deposit the separated portions of plant material of a sufficient size in the separator bins 52 while permitting the air and possibly fine debris to exit the separators 48 at their respective separator outlets 54, such as into a filtering bag (not shown).

The system 32 also includes a high-pressure water source 56 for use in a self-cleaning sub-system 58 described further below.

The system 32 also includes a controller 60 for controlling operations of the various sub-systems of the system 32, as described further below.

Referring to FIGS. 5 to 8, the apparatus 10 includes a cylindrically shaped drum 62 having slots 64 in a main body 66 of the drum 62. The drum 62 can be made any suitable size, including having any suitable diameter, length, and thickness. In some embodiments, the diameter of the drum 62 can be as large as 4' (1.22 m), or as small as 6" (15.2 cm), for example. In variations, the length of the drum 62 can be anywhere in the range from 2' (61.0 cm) to 12' (3.66 m), for example. The thickness of the drum 62 material can be anywhere in the range from 0.03125" (0.794 mm) to 0.125" (3.18 mm). In the first embodiment, the diameter of the drum 62 is typically 18" (45.7 cm), the drum 62 length is typically 6' (1.83 m), and its material thickness is typically 0.0625" (1.59 mm).

A drum motor 68 drives its output shaft 70 having attached thereto a drum-motor pulley 72, which in turn drives a drum belt 74 connected to a drum pulley 76. The drum pulley 76 is rotatably coupled to a central drum axle 78 via a drum hub 79. The drum pulley 76 is also attached via the drum hub 79 to the main body 66 via drum spokes 80, such that the drum motor 68 is operable to rotate the drum 62 about a drum axle 78 axis. Preferably, each hub 79 is journaled for rotation about the stationary drum axle 78 by roller bearings or other bearings (not shown) within the hub 79. Preferably, two sets of drum spokes 80 are disposed at opposing ends of the drum 62. Any suitable number of drum spokes 80 may be employed at each drum 62 end, such as a number in the range of four to eight spokes 80 per drum 62 end for example. The use of drum spokes 80 advantageously maintain consistent roundness of the drum 62.

While FIGS. 5 to 8 show a belt-drive mechanism for the drum 62, in general any suitable driving mechanism for the drum 62 may be employed. In variations, the drum 62 may be roller-driven, gear-driven or otherwise driven by a cogged device (not shown), directly attached to the output shaft 70 of the drum motor 68, integrally motorized such as by the drum axle 78 forming the output shaft 70, driven by another mechanism, or any combination thereof for example.

In the first embodiment, the drum motor 68 is operable to rotate the drum 62 in either direction (e.g. either clockwise or counterclockwise) and at variable speeds. For example, the drum 62 can rotate as slowly as a few revolutions per minute (RPM) or as much as several hundred RPM. In the first embodiment, the drum 62 typically rotates in the range of 10 RPM to 75 RPM, for example. The exact rotation speed of the drum 62 is preferably set to the particular strain or type of plant material being processed and the desired trimming effect.

Figure 10:
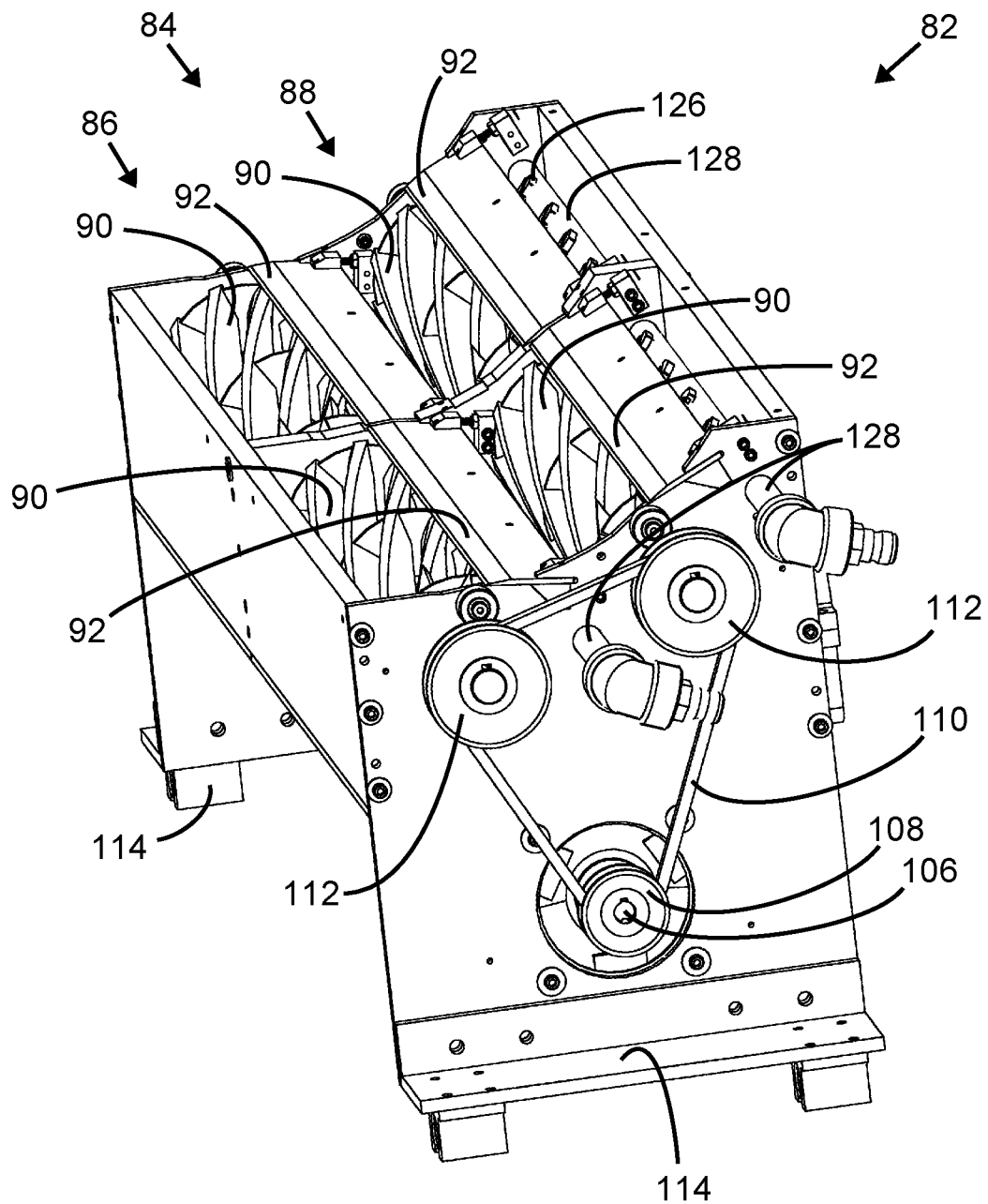
FIG. 10 is a perspective view of the cutting reel assembly shown in FIG. 9, showing a rearward cutting reel and a forward cutting reel.

Referring to FIGS. 5 to 10, the apparatus 10 includes a cutting module, such as the cutting reel assembly 82 disposed beneath the drum 62 according to the first embodiment. The cutting reel assembly 82 includes a plurality of cutting reels 84 as shown in FIG. 10, including one pair of rearward cutting reels 86 and one pair of forward cutting reels 88. In the first embodiment, each rearward cutting reel 86 is positioned lower than its corresponding forward cutting reel 88, so as to maintain a specifiable gap between each cutting reel 84 and the drum 62, while accommodating the cylindrical shape of the drum 62.

In the first embodiment, each cutting reel 84 defines a helical blade 90 that cooperates in scissor-fashion with a cutting blade 92 to cut portions of plant material exiting the drum 62 through one or more slots 64.

Employing a plurality of cutting reels 84 advantageously provides greater cutting area in comparison to a single cutting reel 84. While the first embodiment includes the pair of cutting reels 84, in general the cutting reel assembly 82 may include any number of cutting reels 84.

Figure 5:
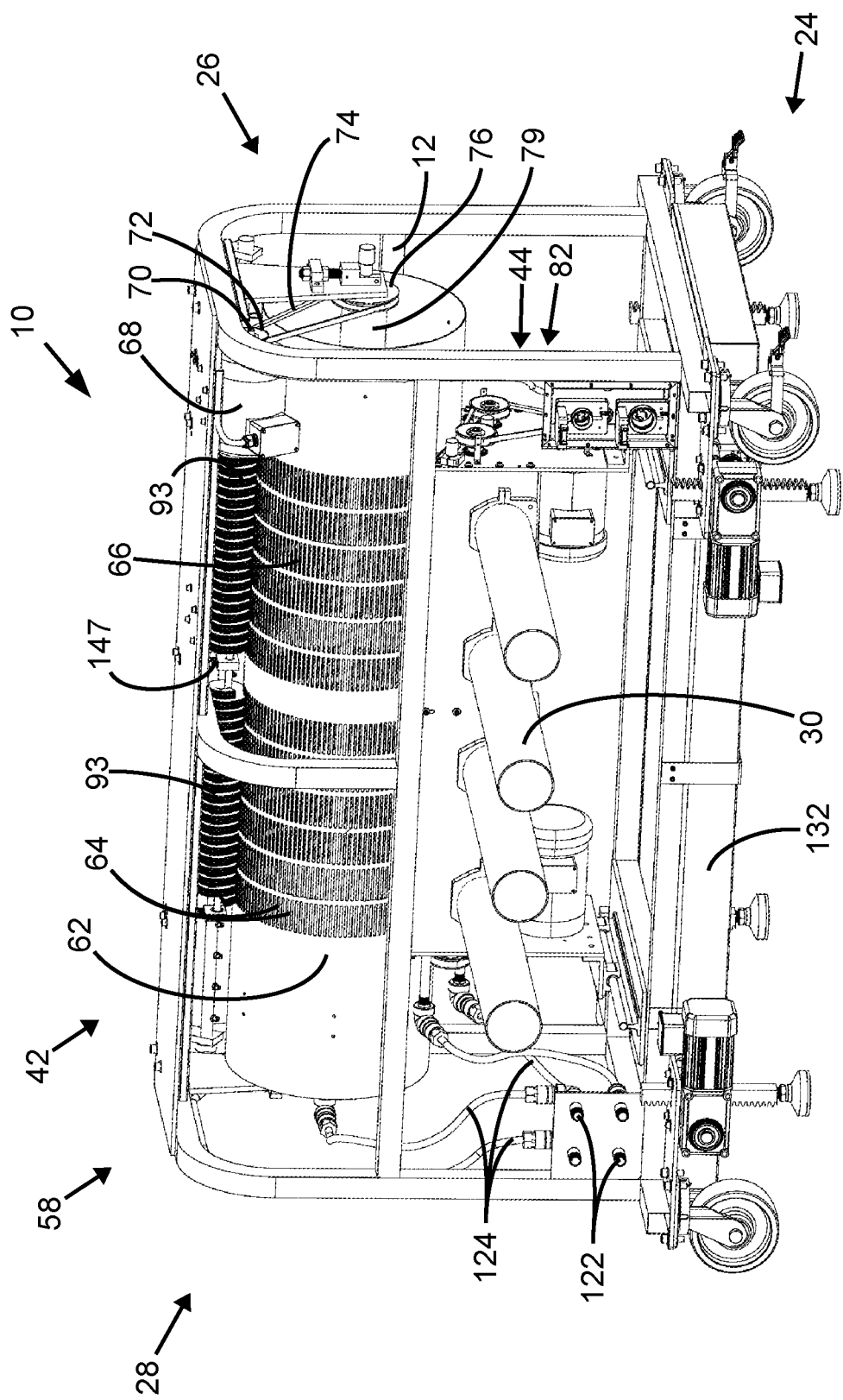
FIG. 5 is a perspective front view of the apparatus shown in FIG. 1, showing internal components of the apparatus with its outer enclosure removed.
Figure 8:
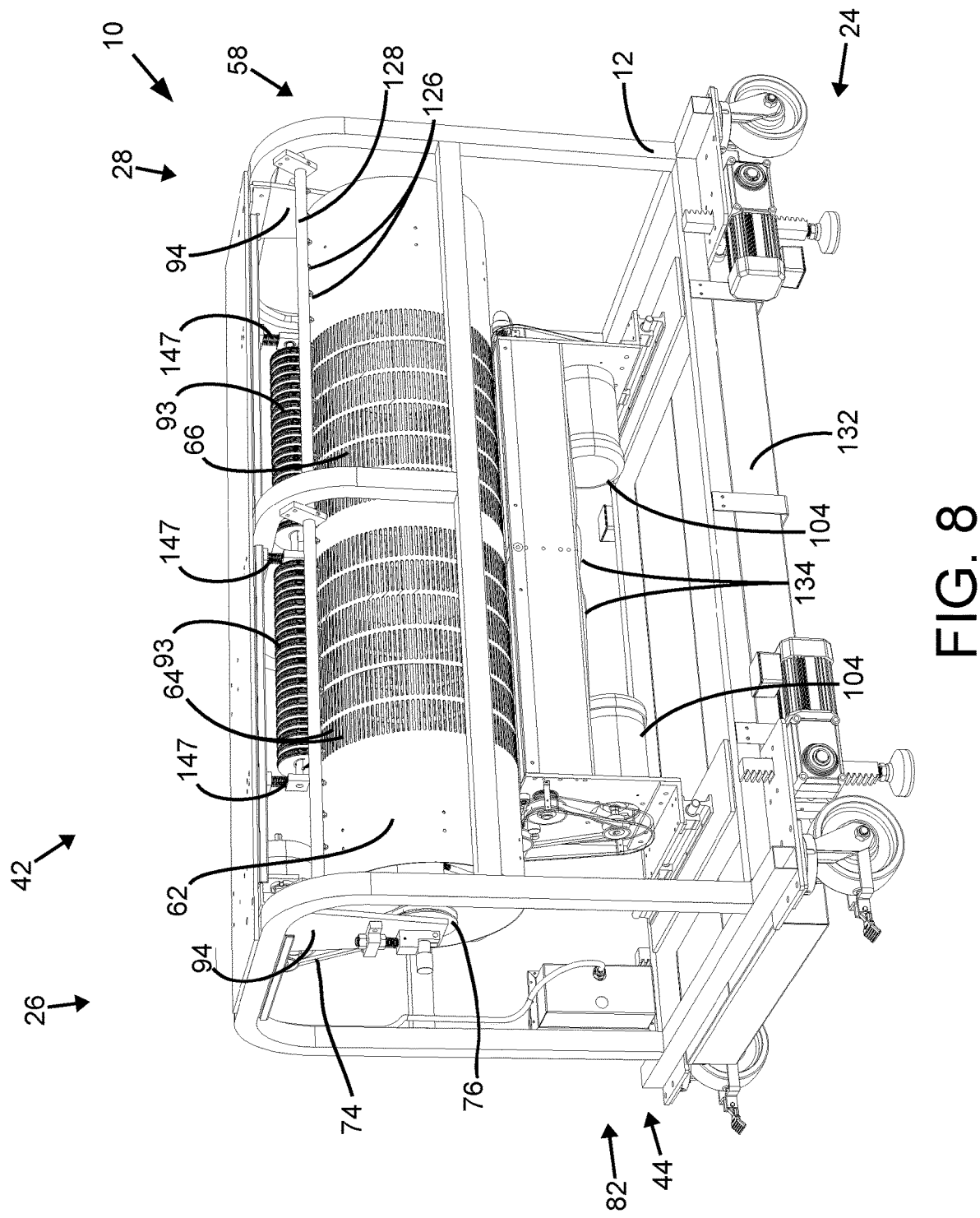
FIG. 8 is a perspective view of the apparatus shown in FIG. 1, showing internal components viewed from the rear side of the apparatus.
Figure 9:
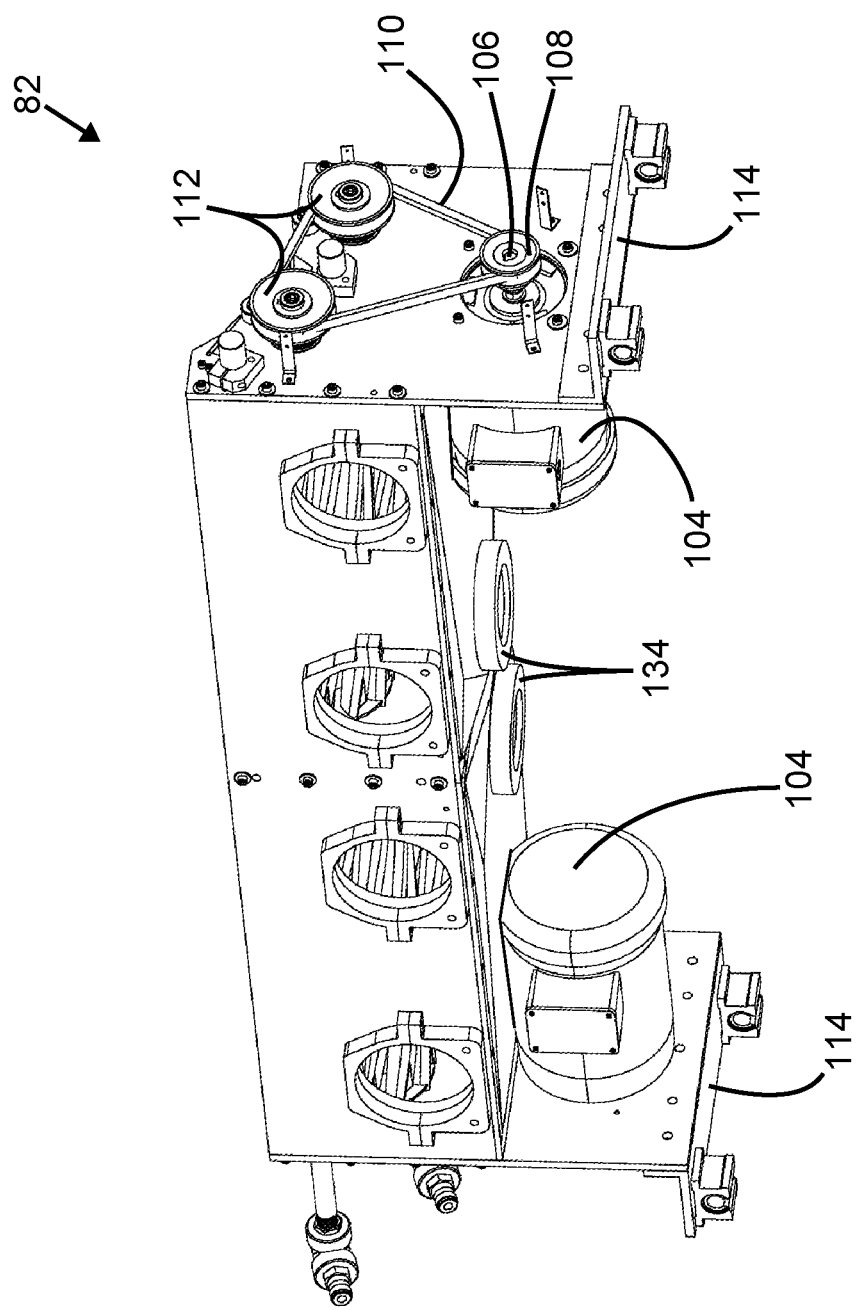
FIG. 9 is a perspective view of a portion of the apparatus shown in FIG. 1, showing a cutting reel assembly.

The apparatus 10 includes a drum slot scrubber, such as the pair of longitudinal brushes 93 particularly visible in FIGS. 5 and 8. The brushes 93 advantageously clears each drum slot 64 of plant material or debris between passes of the slot 64 against the cutting reel assembly 82. Pressure from each brush 93 against corresponding drum slots 64 advantageously urges the plant material or debris back into the interior of the drum 62.

In some embodiments, the gap between the drum 62 and each cutting reel 84 at the cutting interface of each cutting reel 84 can be varied, such as by raising or lowering the drum 62 and/or the cutting reel assembly 82 relative to each other. Preferably the brushes 93 is spring biased toward the drum 62 within a range of motion to enable height adjustment of the drum 62 with respect to the cutting reel 84 while maintaining contact between the brushes 93 and the drum 62.

Figure 6:
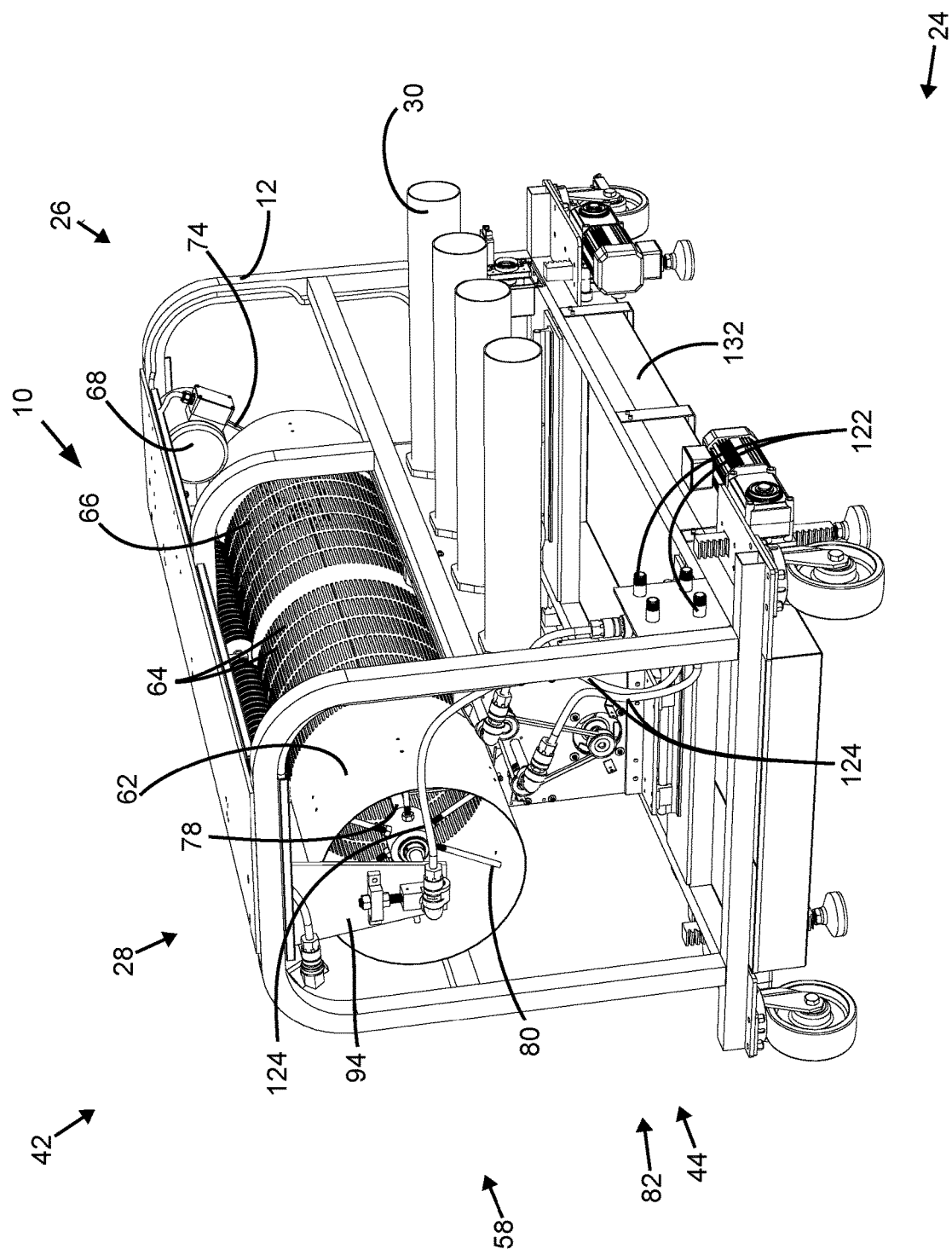
FIG. 6 is a perspective view of the apparatus shown in FIG. 1, showing internal components viewed from the outfeed end and front side of the apparatus.
Figure 7:
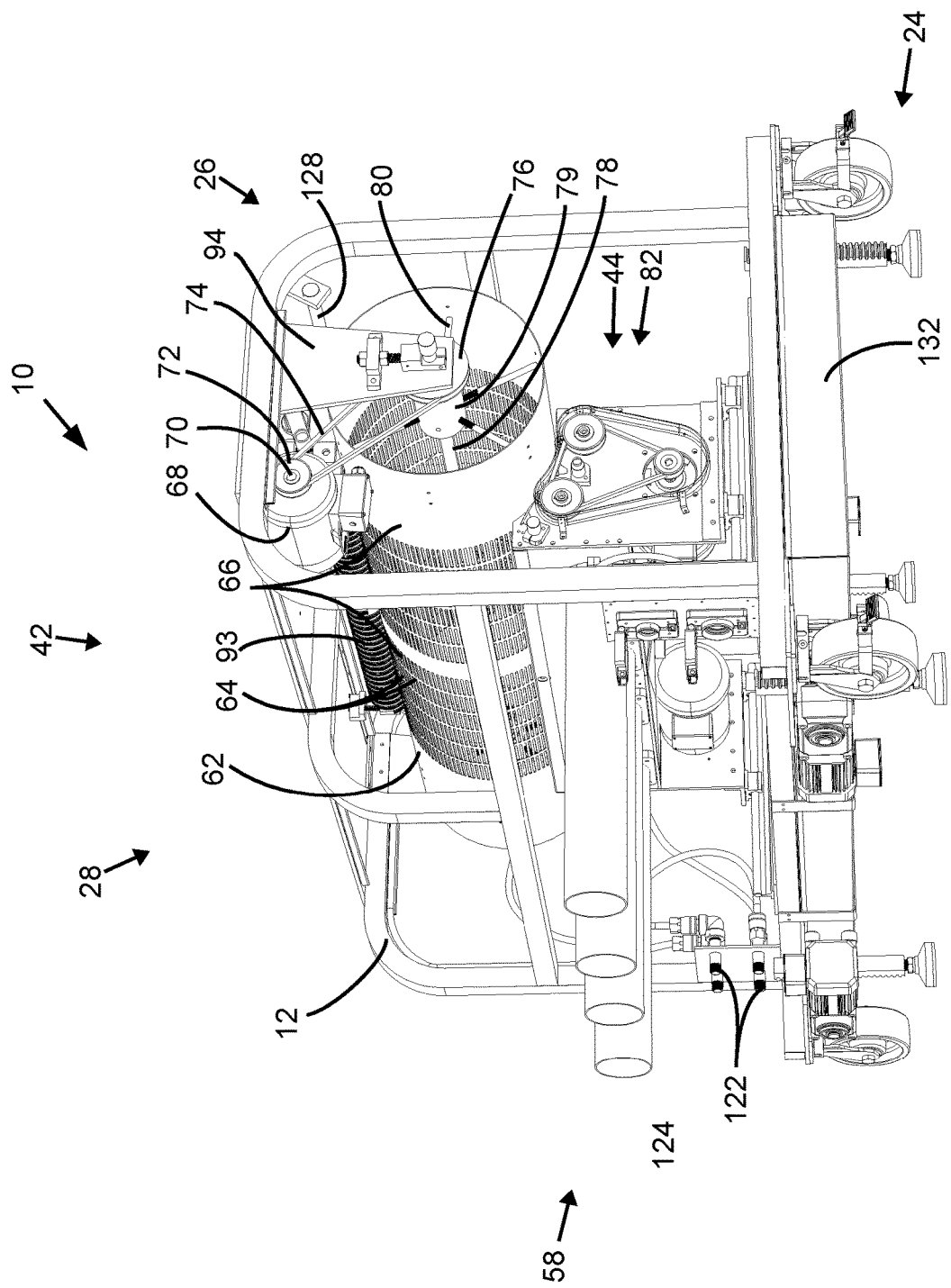
FIG. 7 is a perspective view of the apparatus shown in FIG. 1, showing internal components viewed from the infeed end and front side of the apparatus.
Figure 11:
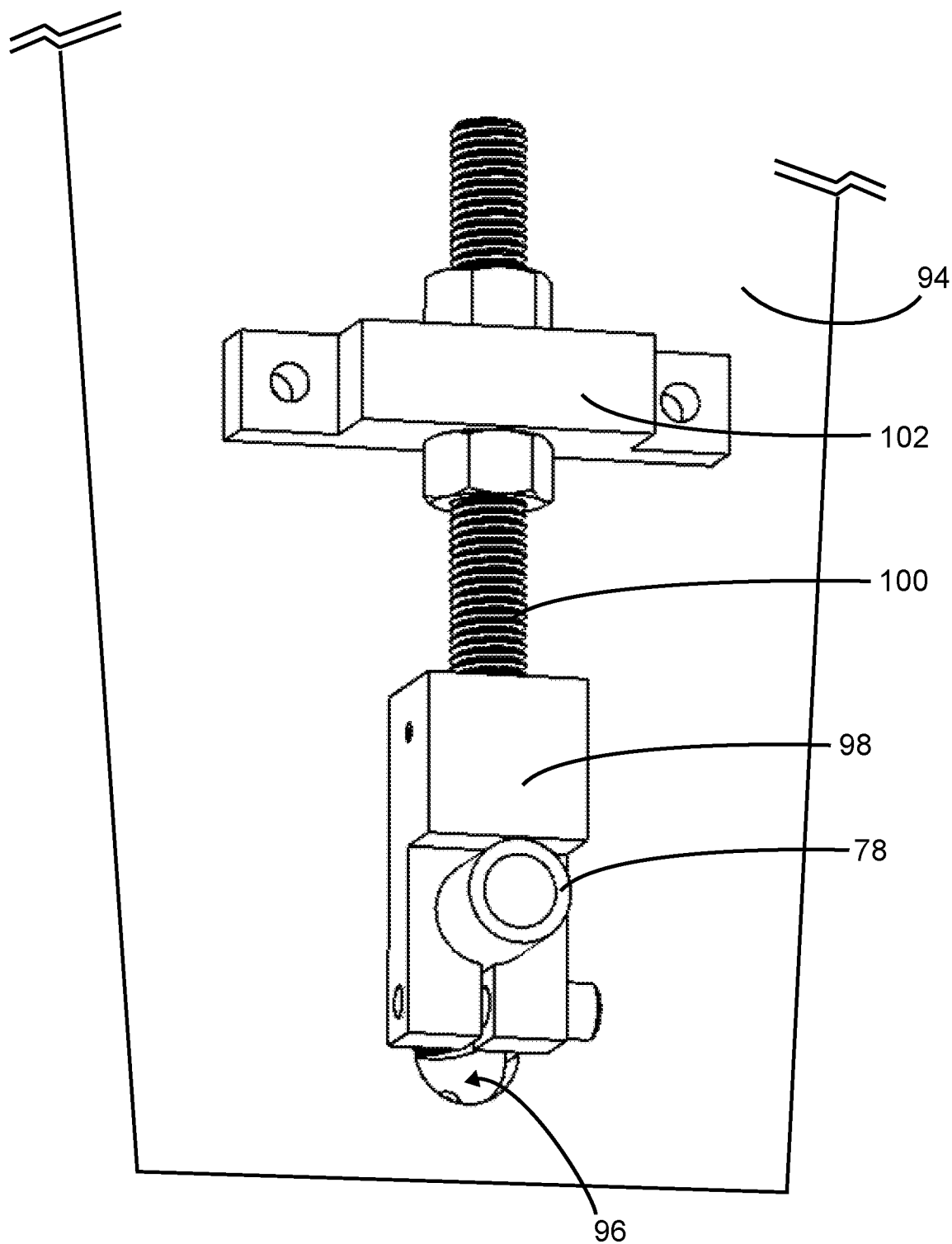
FIG. 11 is a close-up perspective view of a portion of the apparatus shown in FIG. 1, showing a drum bracket.
Figure 12:
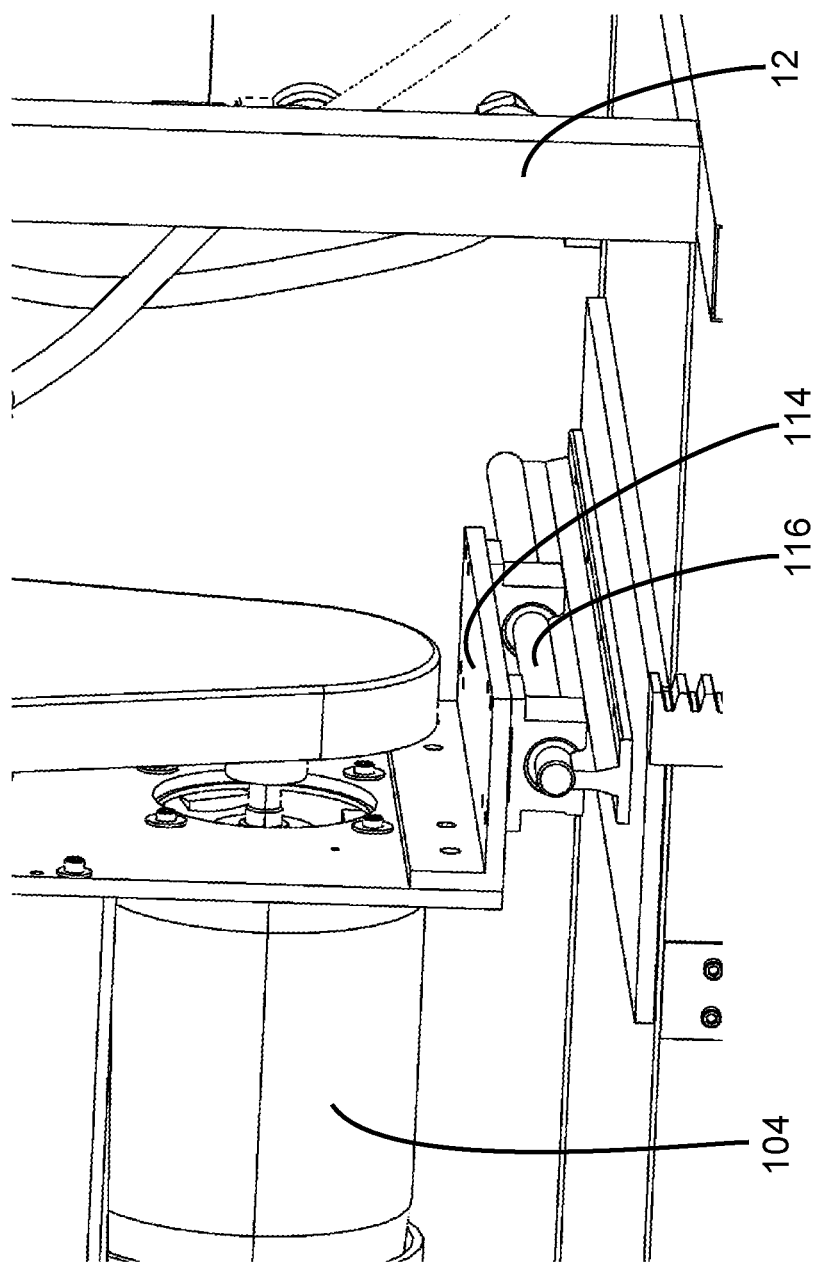
FIG. 12 is a close-up perspective view of a portion of the apparatus shown in FIG. 1, showing a mounting bracket and rail.
Figure 13:
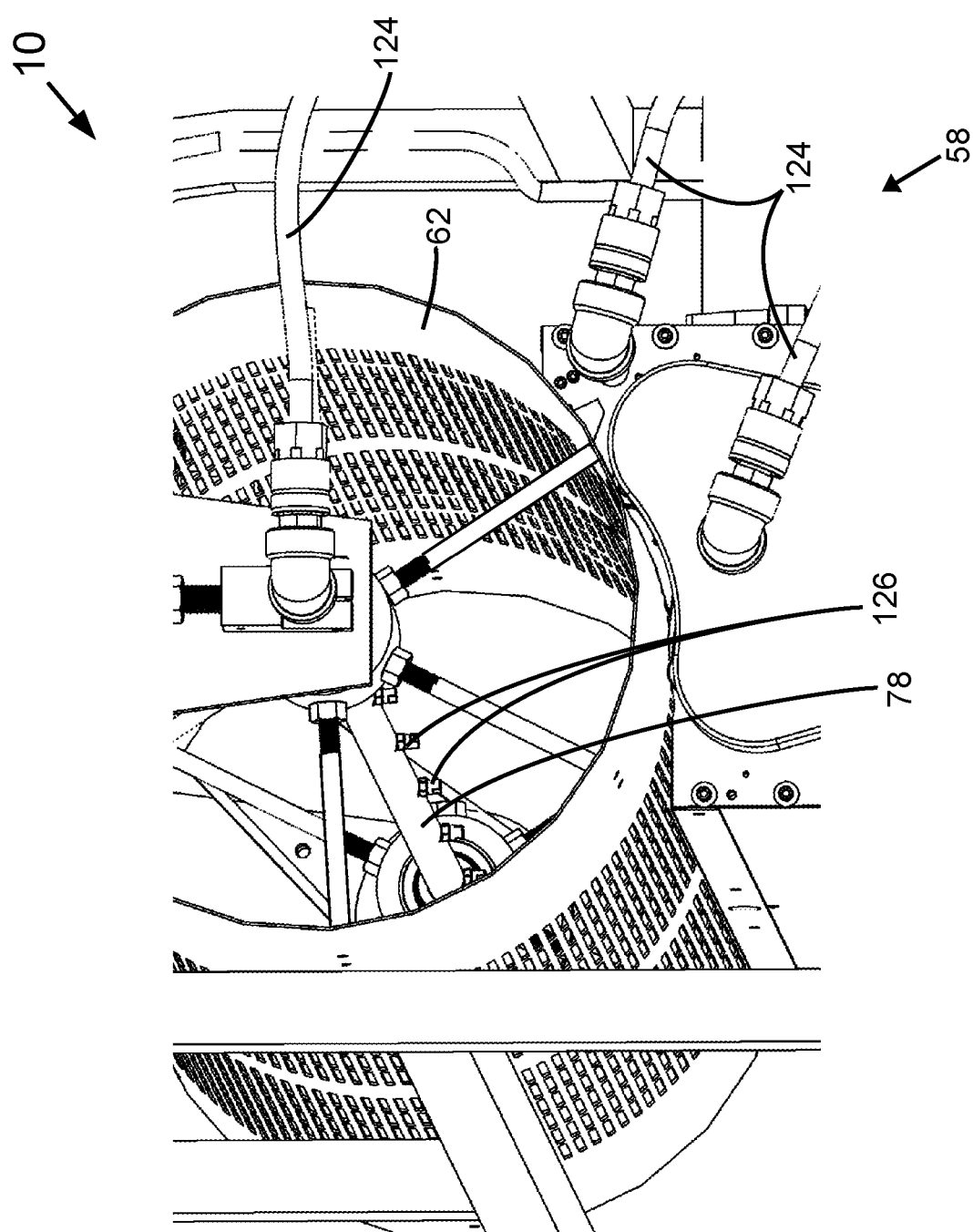
FIG. 13 is a close-up perspective view of a portion of the apparatus shown in FIG. 1, showing nozzles attached to a hollow axle inside a drum of the apparatus.

Referring to FIGS. 6 and 7, the drum 62 in the first embodiment is rotatably and slidably coupled to the frame 12 at a pair of slotted drum brackets 94 disposed at opposing ends of the frame 12. Referring to the close-up of FIG. 11, each drum bracket 94 includes a bracket slot 96 through which the drum axle 78 passes and is clamped by an axle clamp 98. Thus, the drum axle 78 is fixed to the frame 12 via the drum bracket 94 such that the drum axle 78 is stationary relative to the rotatable drum 62. The axle clamp 98 is threadedly coupled via a threaded rod 100 to a bracket mount 102 attached to the drum bracket 94. By manually adjusting the threaded rod 100 distance between the axle clamp 98 and the bracket mount 102, the height of the drum 62 is adjusted and, in particular, is adjusted relative to the cutting reel assembly 82.

While the Figures show a manual adjustment mechanism for adjusting the height of the drum 62 relative to the cutting reel assembly 82, in some embodiments an automatic adjustment mechanism is employed. In such embodiments, a linear actuator, stepper motor, or other electro-mechanical mechanism may be employed to automatically adjust the drum 62 height in response to user input, computation, or other causes, for example.

Adjusting the gap between the drum 62 and the cutting reels 84 advantageously facilitates separating or trimming plant material at a desired closeness of trim. For example, a relatively wider gap can be initially employed to remove extraneous outer leaf portions of plant material, which can be discarded, and then the gap can be narrowed to separately remove the more valuable sugar leaf portion of the plant material, which can be collected. Other arrangements of sequential processing at different gap distances may be employed.

Referring back to FIGS. 5 to 9, the cutting reel assembly 82 includes a pair of cutting-reel motors 104 disposed at opposing ends of the cutting reel assembly 82. Each cutting-reel motor 104 drives its output shaft 106 having attached thereto a cutter-motor pulley 108, which in turn drives a cutting-reel belt 110 connected to a pair of cutting-reel pulleys 112. Each cutting-reel pulley 112 is rotatably coupled to one cutting reel 84. Thus, the pair of cutting-reel motors 104 are cooperatively operable to rotate the plurality of cutting reels 84. While a pair of cutting-reel motors 104 are cooperatively employed in the exemplary embodiment of FIGS. 5 to 9, in a variation only one cutting-reel motor 104 is employed. In some embodiments, one cutting-reel motor 104 is employed for cutting reel 84. Other variations are possible.

While FIGS. 5 to 9 show a belt-drive mechanism for the cutting reels 84, in general any suitable driving mechanism for the cutting reels 84 may be employed. In variations, each cutting reel 84 may be roller-driven, gear-driven or otherwise driven by a cogged device (not shown), directly attached to the output shaft 106 of the cutting-reel motor 104, integrally motorized such as by a portion of the cutting reel 84 forming the output shaft 106, driven by another mechanism, or any combination thereof for example.

In the first embodiment, the cutting-reel motor 104 is operable to rotate the cutting reels 84 in either direction (e.g. either clockwise or counterclockwise) and at variable speeds. For example, the controller 60 in the first embodiment is operable to cause one or more cutting reels 84 located adjacent the infeed end 26 of the drum 62 to rotate in reverse, such that duller edges of the helical blade(s) 90 at the infeed end 26 become leading edges of the helical blade(s) 90 reverse rotation. Also, the controller 60 is operable to cause one or more cutting reels 84 located adjacent the outfeed end 28 of the drum 62 to rotate forwardly, such that sharper edges of the helical blade(s) 90 at the outfeed end 28 become leading edges of such helical blade(s) 90 forward rotation. In this manner, larger portions (e.g. large leaves) of the plant material are pulled away from the plant material being trimmed at the infeed end 26 of the drum 62, while finer trimming of the plant material occurs at the outfeed end 28 of the drum 62.

For some batches of plant material processing, however, a user of the apparatus 10 may prefer to have all cutting reels 84 rotate in the same direction (e.g. reverse or forward), for example. The speed of rotation of the cutting reels 84 can be varied by the controller 60 to achieve different trimming effects for different strains or types of plant material. For example, the speed of rotation of the cutting reels 84 in the first embodiment can be as slow as 50 RPM (Revolutions Per Minute) and as quick as 1750 RPM, for example.

Referring to FIGS. 5 to 8 and FIG. 12, the cutting reel assembly 82 in the first embodiment includes a pair of mounting brackets 114 that are slidably mounted on a pair of rails 116 attached to the frame 12. Rail mounting advantageously facilitates removal and maintenance of the cutting reel assembly 82. However, in general any suitable attachment technique may be employed.

In some embodiments, a vacuum source, such as the suction air pumps 50 (FIGS. 3 and 4), of the vacuum sub-system 46 is employed to urge movement of wet or dry plant matter within or through the apparatus 10, such as by pulling plant matter through the slots 64 to exit the drum 62, facilitating the movement of plant matter from the infeed end 26 toward the outfeed end 28 of the apparatus 10, removing cut plant matter away from the cutting reels 84, removing plant matter from the apparatus 10 via one or more of the outlet ducts 30, other movements, or any combination thereof for example.

In some embodiments, the vacuum source forms part of the apparatus 10. In some embodiments, however, the vacuum source is detachably attachable to the apparatus 10. In embodiments employing the suction air pump(s) 50, the apparatus 10 may include any combination of hoses, pipes, enclosures, shrouds, guides, or other hardware to guide and/or control the effect of air flow and suction created by the suction air pump(s) 50.

The vacuum sub-system 46 is operable to advantageously increase the speed at which plant material and removed plant matter moves through the apparatus 10. Also, the vacuum sub-system 46 advantageously facilitates a closer trimming of the plant material being trimmed, by forcing the plant material against the slots 64 of the drum 62 with greater force than generated by gravity alone.

Referring to FIGS. 3 to 8 and FIGS. 13 and 14, the apparatus 10 in the first embodiment includes the self-cleaning sub-system 58 that is operable to receive a liquid from a liquid source, such as the high-pressure water source 56, and apply the liquid to various internal components of the apparatus 10. Typically, the liquid is water or water-based, such as being a mixture of water and a cleaning agent. A hot water tank 118 may be employed for electrically heating water, and a water pump 120 for pressurizing the water. Additives, such as a cleaning agent or a water conditioning agent may be added to the water either before or after heating and either before or after pressurizing. High-pressure hot water is then received by the apparatus 10, such as at the water inlets 122. The water can be at any desired pressure and temperature. For example, the water may be received by the apparatus 10 at the water inlets 122 when it is at a pressure in the range of 1750 PSI (12066 kPa) to 2500 PSI (17237 kPa) and at a temperature in the range of 150 degrees Fahrenheit (66 degrees Celsius) to 200 degrees Fahrenheit (93 degrees Celsius).

From the water inlets 122, conduits, such as the hoses 124 best seen in FIG. 6, transport the high-pressure hot water mixture from the water inlets 122 to various components of the apparatus 10. The self-cleaning sub-system 58 advantageously reduces or eliminates the need for hand scrubbing or other manual or partially automatic methods of cleaning to clean internal components of the apparatus 10.

One hose 124 is connected to the drum axle 78, which is hollow and acts as a water pipe for transporting water received from the water source 56. The hollow drum axle 78 includes a number of pores (not visible in the drawings) and nozzles 126 for ejecting water toward the inside surface of the drum 62. In some embodiments, a second water pipe or hose 124 (not shown) may extend from the water inlet 122 to the other end of the drum axle 78.

Figure 14:
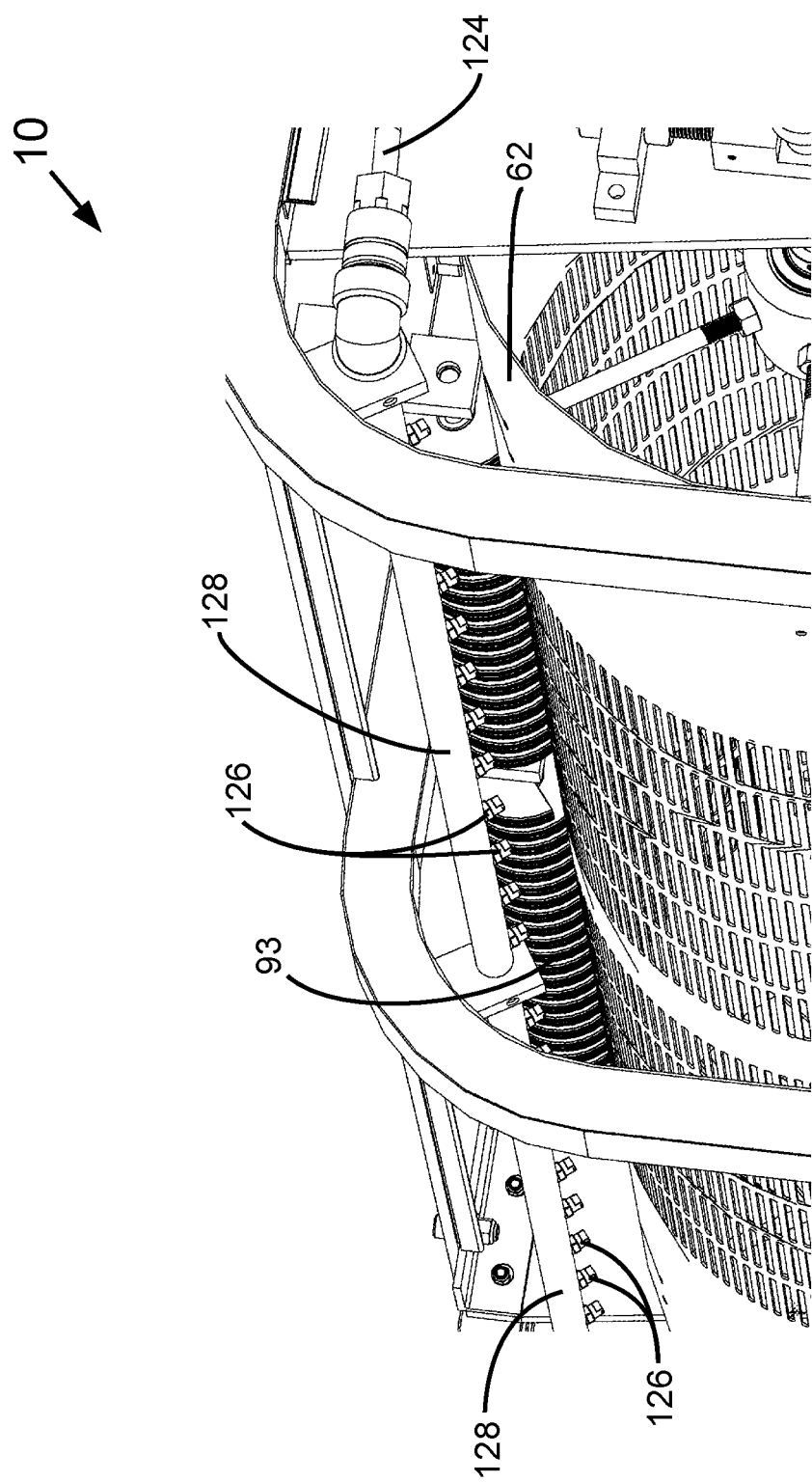
FIG. 14 is a close-up perspective view of a portion of the apparatus shown in FIG. 1, showing a spray tube positioned outside the drum.

In the first embodiment with particular reference to FIG. 14, a second hose 124 is connected between one water inlet 122 to a spray tube 128 having nozzles 126 positioned to eject toward the outside surface of the drum 62.

The drum 62 is typically rotated while the hot water mixture is sprayed toward the drum 62 at its inside and outside surfaces. After being sprayed, the water may be turned off and the drum 62 spun, such as at a faster rate, to dry the drum 62.

Figure 15:
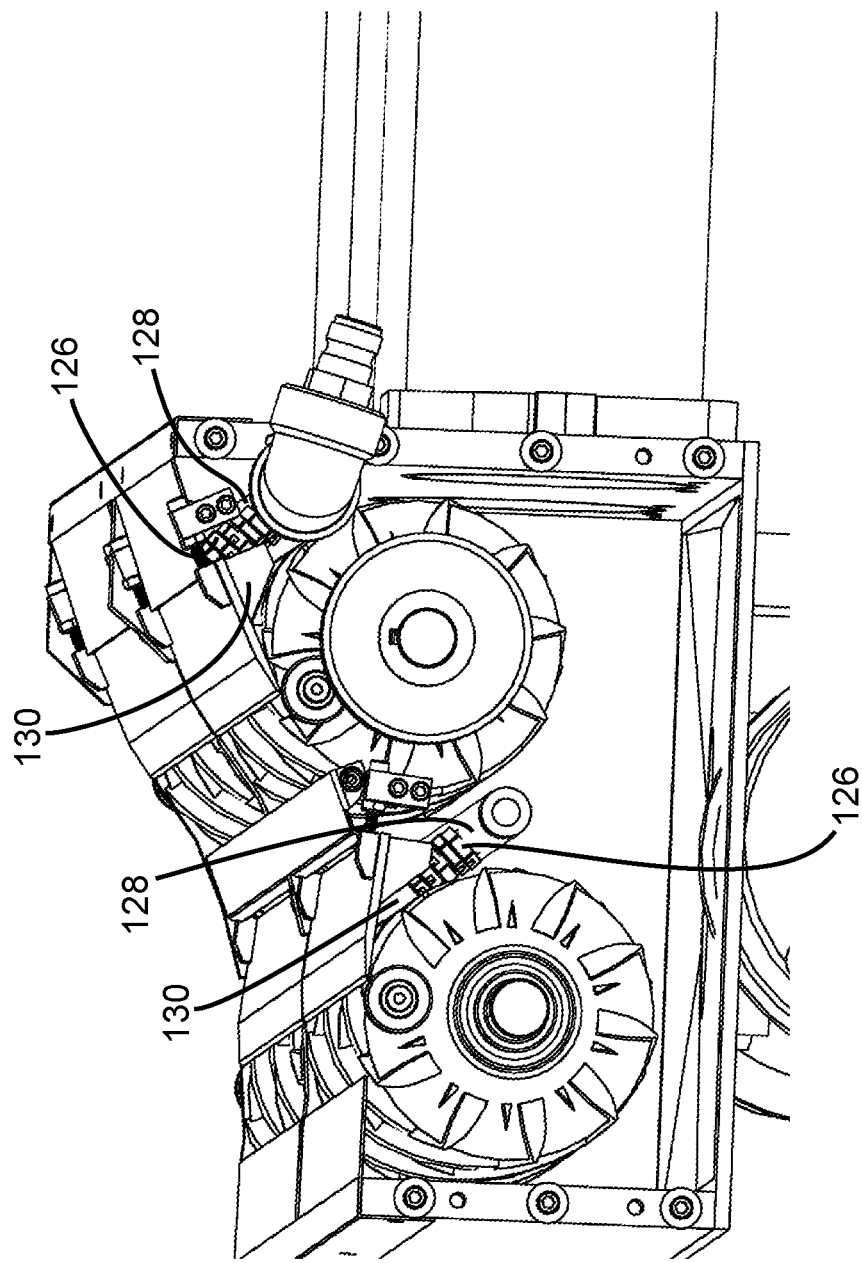
FIG. 15 is a close-up view of a portion of the cutting reel assembly shown in FIG. 9, showing spray tubes located within the cutting reel assembly.

Referring to FIG. 15, two more hoses 124 are connected to spray tubes 128 positioned adjacent each of the cutting reels 86 and 88, respectively. Nozzles 126 attached to each cutting reel spray tubes 128 are positioned to eject water or water mixture toward each of the cutting reels 86 and 88, respectively. Guides 130 direct the sprayed water for more effective cleaning of the cutting reels 86 and 88.

The nozzles 126 can eject the water when it is at any desired pressure and temperature. For example, the water may be ejected by the apparatus 10 at the nozzles 126 when it is at a pressure in the range of 1750 PSI (12066 kPa) to 2500 PSI (17237 kPa) and at a temperature in the range of 150 degrees Fahrenheit (66 degrees Celsius) to 200 degrees Fahrenheit (93 degrees Celsius).

Other water pipes and/or hoses (not shown) within the enclosure terminate in other nozzles (not shown) may also be strategically located to expose selected internal components of the apparatus 10 to high-pressure, hot water streams or sprays. Such nozzles may include nozzle solenoids (not shown) to open and close, including possibly opening to a selectable degree, nozzle valves (not shown). Such nozzle solenoids may be electrically controlled, although other control methods are possible. In some embodiments, one or more solenoids perform the function of a nozzle valve.

The enclosure 14 at its inner surface guides overspray and waste water including debris downward to a catch basin 132. In variations of embodiments, a variety of water guides, plates, curved surfaces, or combinations thereof (not shown) guide overspray, waste water and debris downward toward the catch basin 132. Preferably, such water guiding components of the apparatus 10 are dimensioned and disposed to advantageously minimize overspray and the effects of overspray.

In some embodiments, the catch basin 132 has a drain (not shown) for draining waste water from the catch basin 132. In some embodiments, the drain includes a filter, such as cone-shaped filter, for catching debris and the like.

Referring again to FIG. 9, the cutting reel assembly 82 includes lower outlets 134 dimensioned to direct water of the self-cleaning sub-system 58 downward away from the cutting reel assembly 82 and toward the catch basin 132.

Additionally or alternatively to the self-cleaning aspect of the sub-system 58, the sub-system 58 is operable to apply a liquid, such as water at any desired temperature and pressure, to various internal components of the apparatus 10 so as to provide wet processing of plant material.

Referring to FIGS. 16 to 19, the enclosure 14 includes on each of its front and rear sides an upper shroud 136 and a lower shroud 138 for directing overspray toward the catch basin 132. The upper shroud 136 is attached at its upper connection 140 and its lower connection 142.

Figure 16:
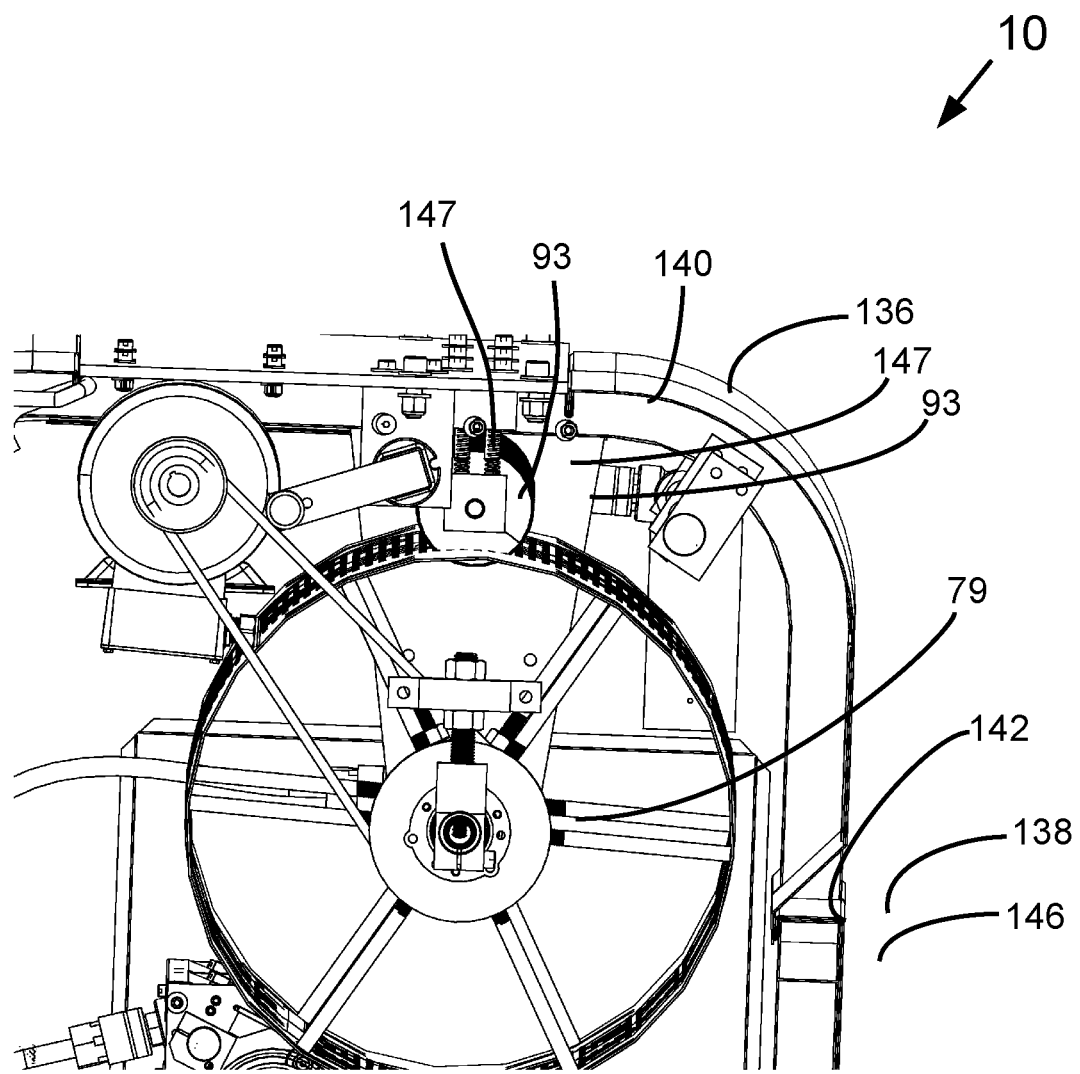
FIG. 16 is a sectional view of a portion of the apparatus shown in FIG. 1, showing an upper shroud and a portion of a lower shroud.
Figure 17:
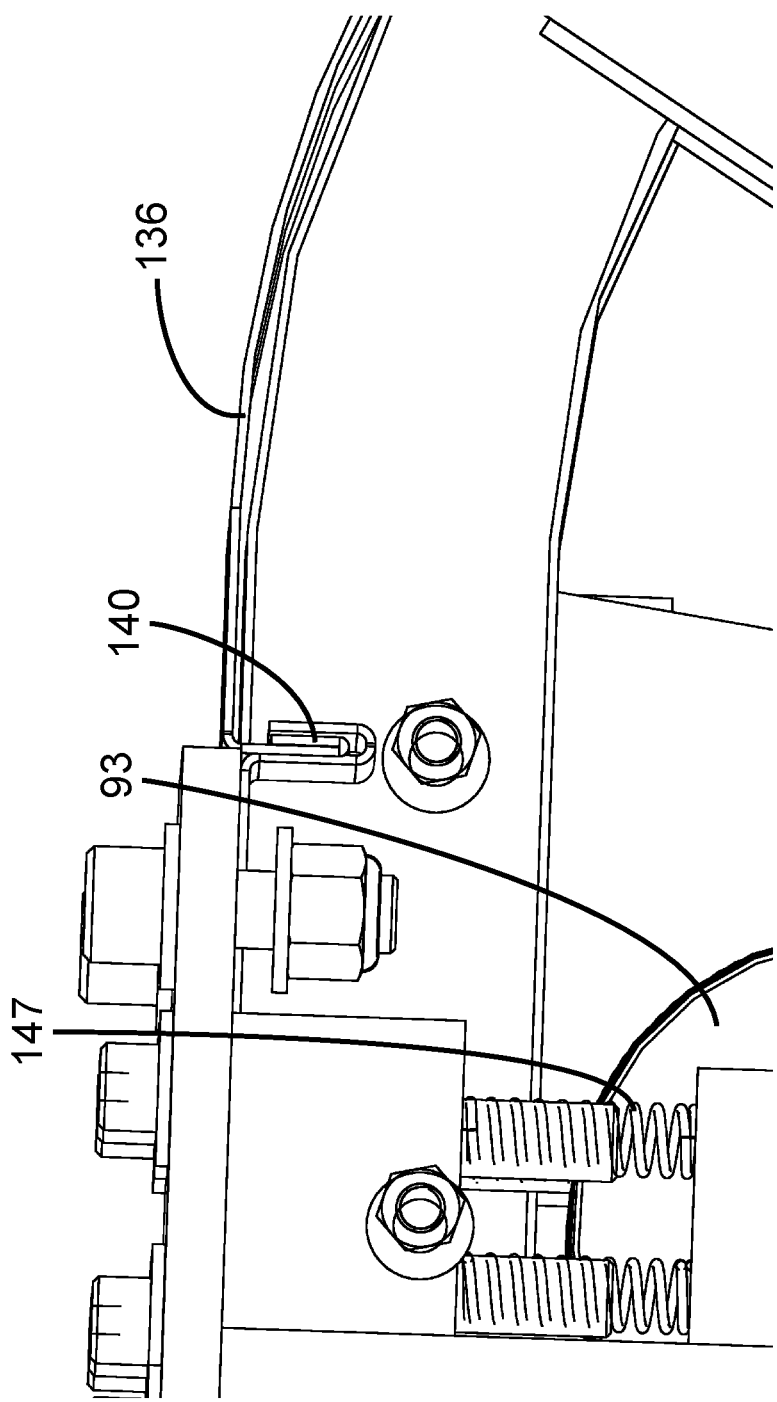
FIG. 17 is a sectional view of a portion of the upper shroud shown in FIG. 16, showing an upper connection of the upper shroud.

Referring to FIG. 17, the upper connection 140 of the upper shroud 136 inserts into a channel 144 attached to the frame 12. Preferably, the sheet material of the upper shroud 136 is sufficiently flexible and resilient to permit placement of the lower connection 142 (of the upper shroud 136) on an inner side of a frame member 146 of the frame 12 as shown in FIGS. 16 and 18.

FIGS. 16 and 17 also show that the brushes 93 (FIGS. 5 and 8) are attached to the frame 12 so as to be biased towards the drum 62, such as by being spring-mounted to the frame 12 by use of the springs 147. The biasing of the brushes 93 towards the drum 62 advantageously facilitates maintaining uniform pressure of the brushes 93 at each drum slot 64, despite height adjustments (FIG. 11) of the drum 62, thereby advantageously avoiding impeding rotation of the drum 62 while simultaneously effectively clearing the drum slots 64 of plant material and debris. Any suitable number of springs 147 may be employed for spring-mounting the brushes 93, and typically, one set of spring(s) 147 is employed at each end of each brush 93. Furthermore, any suitable number of brushes 93 may be employed.

Figure 18:
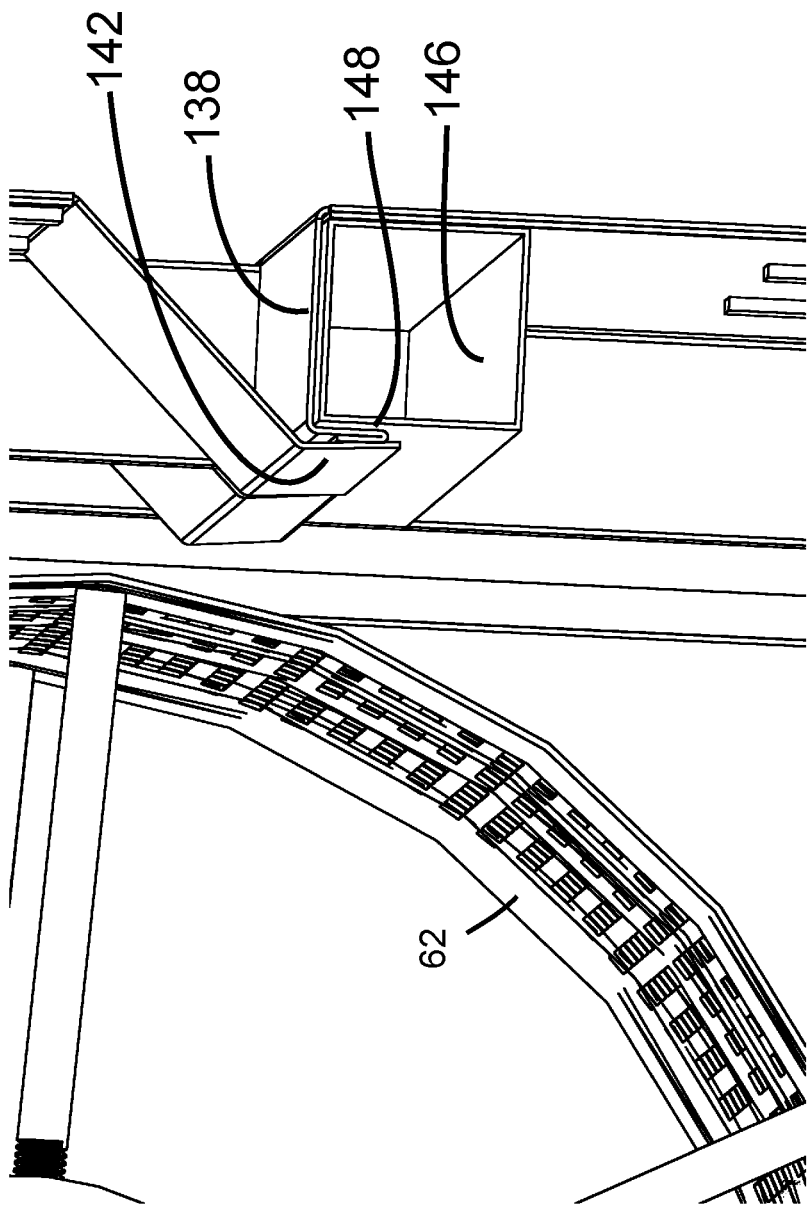
FIG. 18 is a sectional view of a portion of the upper and lower shrouds shown in FIG. 16, showing a lower connection of the upper shroud and an upper connection of the lower shroud.

Referring to FIG. 18, an upper connection 148 of the lower shroud 138 is also positioned on the inner side of the frame member 146. Positioning the lower connection 142 of the upper shroud 136 inwardly of the upper connection 148 of the lower shroud 138, with the upper connection 148 in turn being inward of the frame member 146, advantageously facilitates directing overspray downward toward the catch basin 132.

Figure 19:
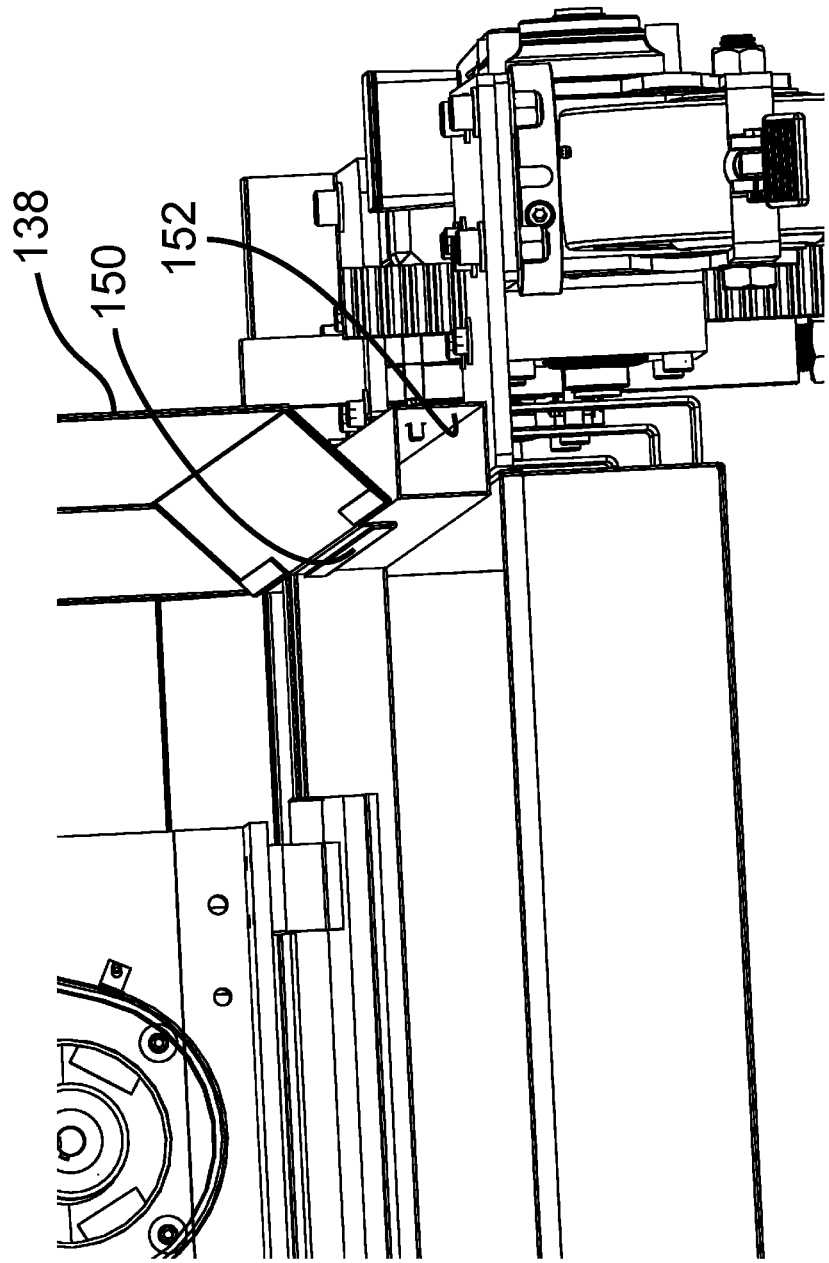
FIG. 19 is a sectional view the lower shroud partly shown in FIG. 16, showing a lower connection of the lower shroud.

Referring to FIG. 19, resilience of the sheet material of the lower shroud 138 permits its lower connection 150 to be placed on an inner side of a lower frame member 152 of the frame 12, thereby directing water downward and inwardly toward the catch basin 132.

In the first embodiment, the upper and lower shrouds 136 and 138 are magnetically attachable to the frame 12, such as by including magnetic material in the frame 12 or in the lower connections 142 and 150, or both in the frame 12 and in either or both of the lower connections 142 and 150. In some embodiments, magnetic material is included in the upper and lower shrouds 136 and 138 at their upper connections 140 and 148, respectively.

In the first embodiment, the enclosure 14 includes handles at the outer side of the enclosure 14 to facilitate installation and removal of the enclosure 14 components such as the upper and lower shrouds 136 and 138.

Figure 20:
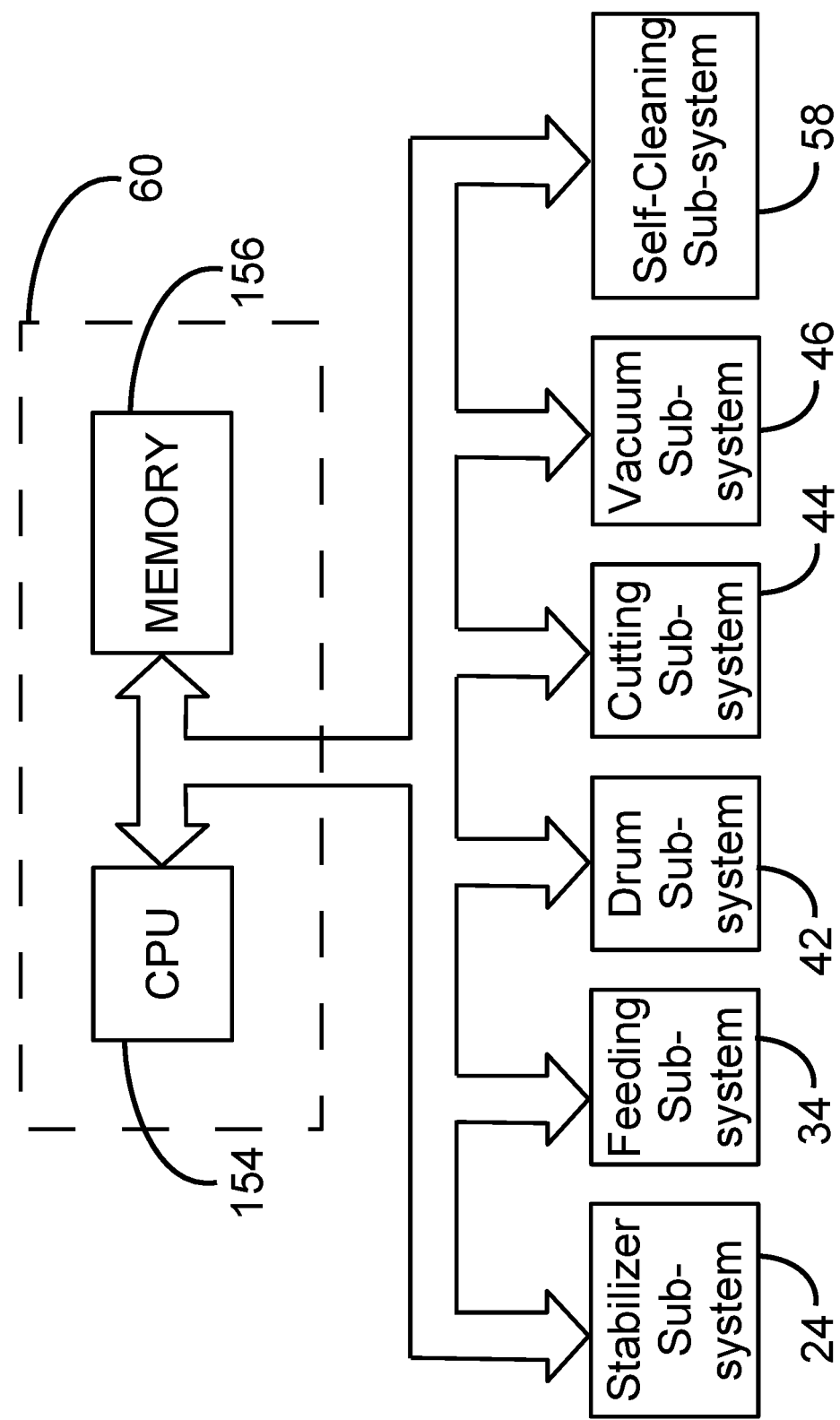
FIG. 20 is a block diagram of a control system associated with the system shown in FIG. 3, showing a CPU and memory of a controller of the control system.
Figure 21:
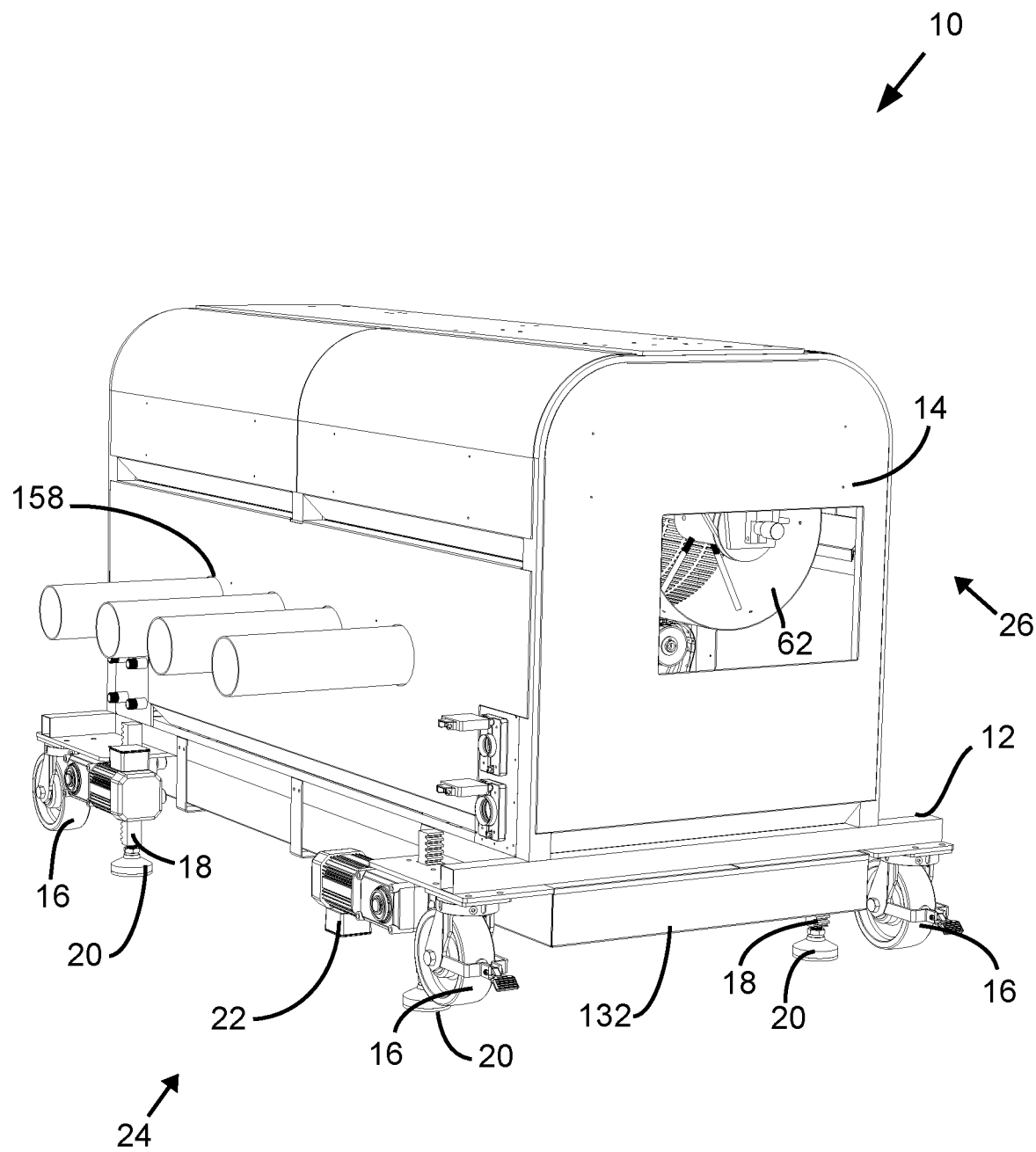
FIG. 21 is a perspective view of an apparatus for processing plant material according to a second embodiment of the invention, showing an infeed end of the apparatus.
Figure 22:
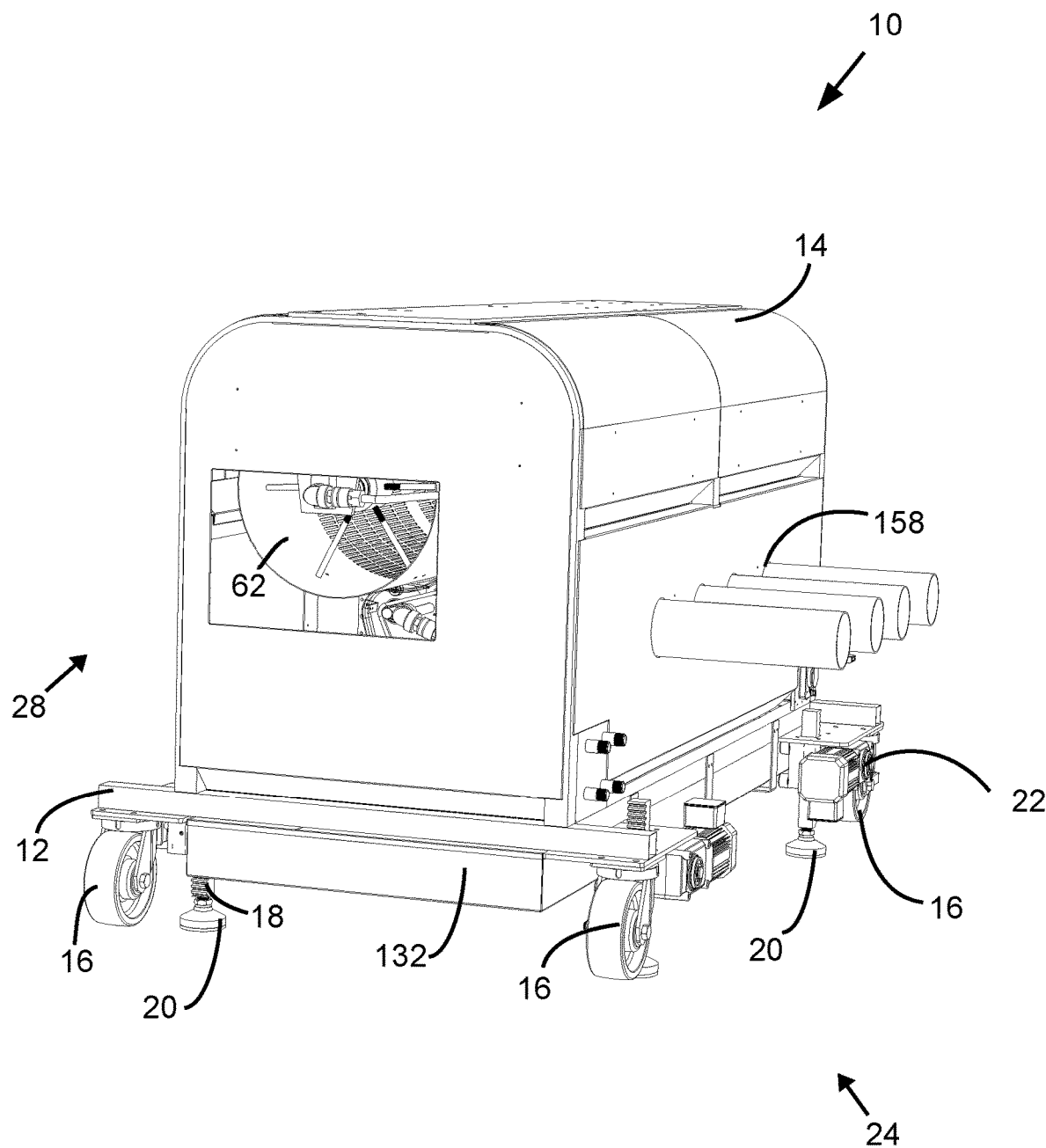
FIG. 22 is a perspective view of the second-embodiment apparatus shown in FIG. 21, showing an outfeed end of the apparatus.
Figure 23:
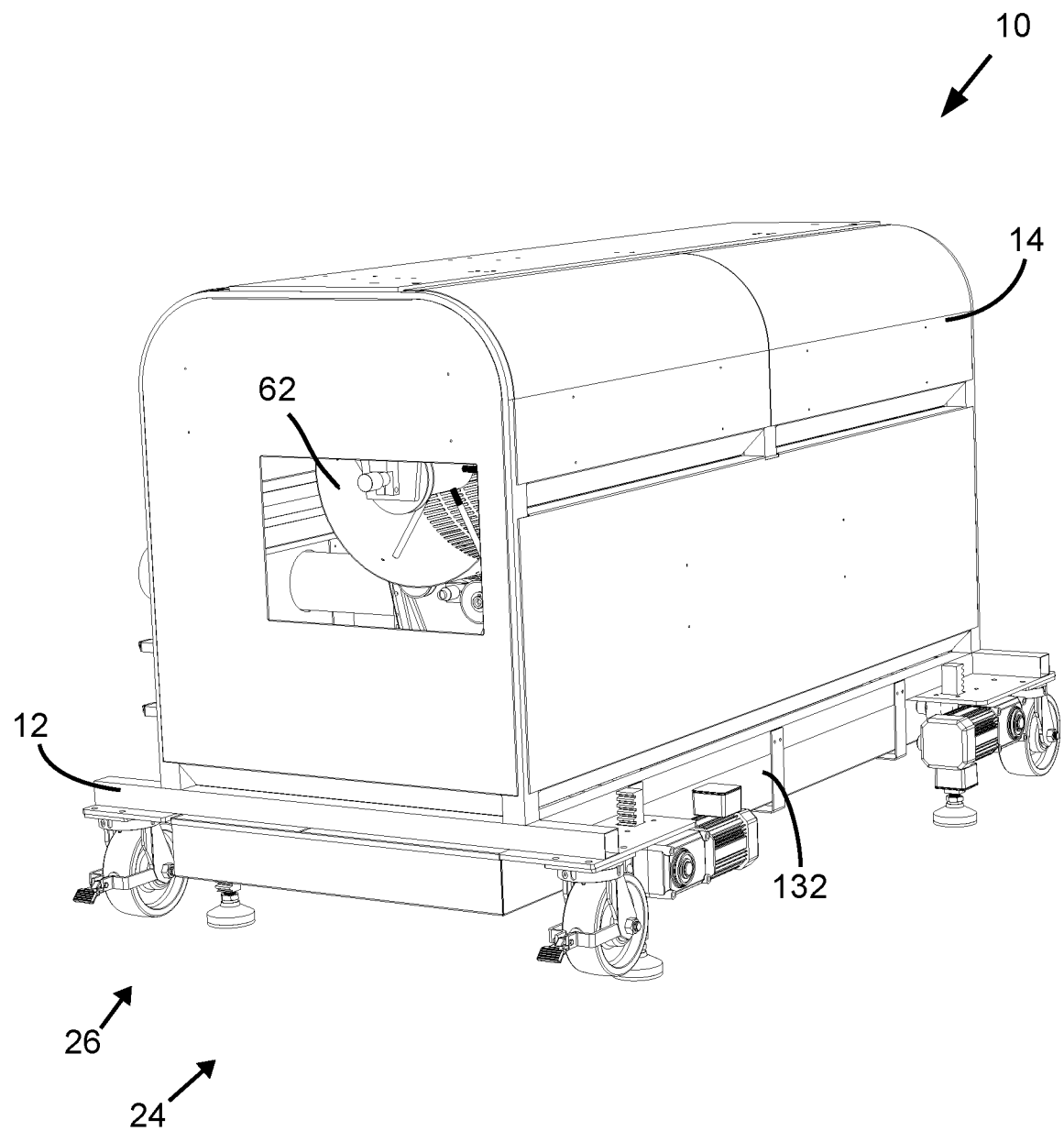
FIG. 23 is a perspective view of the second-embodiment apparatus shown in FIG. 21, showing a rear side of the apparatus.

Referring back to FIGS. 3 and 4 and to FIG. 20, the controller 60 includes a central processing unit, such as the CPU 154 shown in FIG. 20, for performing computations and a memory 156 for storing data and instruction codes for directing operations of the central processing unit.

The controller 60 may be any computing device such as a general purpose computer, industrial-grade computer, microcomputer, minicomputer, mainframe computer, distributed network for computing, functionally equivalent discrete hardware components, etc. and any combination thereof, for example. In the first embodiment, the controller 60 is implemented as an industrial-grade computer in the form of a programmable logic controller (PLC). In some embodiments, the controller 60 is implemented in the form of a programmable logic relay (PLR). In general, any form of control system may be suitably employed.

In the first embodiment, the controller 60 is operable to control the operations of the stabilizer sub-system 24, feeding sub-system 34, drum sub-system 42, cutting sub-system 44, vacuum sub-system 46, and the self-cleaning sub-system 58. By way of example, the controller 60 is operable to control operations of nozzle 126 solenoids to turn on water flow and ejection while controlling the drum motor 68 to effect a desired drum 62 speed during self-cleaning. By way of further example, the controller 60 is operable to control operations of the nozzle 126 solenoids to turn on water ejection while controlling the cutting-reel motor 104 of the cutting sub-system 44 to effect a desired cutting reel 84 speed during self-cleaning. As another example, one or more nozzle 126 solenoids may be operated during processing of plant material for a wet trim process. Additionally, the nozzle 126 solenoids may be closed by the controller 60, the drum motor 68 and/or the cutting-reel motor 104 operated briefly to remove moisture from the drum 62 and the helical blades 90, and then the apparatus 10 can receive plant material and be operated for a dry trim process. In general, the controller 60 is operable to control the direction and speed of rotation of the drum 62 and the direction and speed of rotation of each of the cutting reels 84 in accordance with pre-determined parameters specific to each different strain of plant material, thereby optimizing the processing of each different strain of plant material. As a further example, the controller 60 is operable in the first embodiment to control the stabilizer motors 22 between batches of different plant material to optimize the amount of tilt of the apparatus 10 to each different type of plant material that is processed by the apparatus 10. Furthermore, the controller 60 in the first embodiment is operable to control the stabilizer motors 22 to effect a desired tilt, or lack thereof, for self-cleaning between batches of plant material.

In some embodiments, the controller 60 is additionally or alternatively operable to control operations of the suction air pumps 50 (FIGS. 3 and 4) of the vacuum sub-system 46. For example, increasing the amount of vacuum suction increases the pressure pulling plant material through the drum slots 64, thereby affecting the extent of trimming applied to the plant material.

In the first embodiment, the controller 60 is operable, after a self-cleaning operation is completed, to control the stabilizer sub-system 24 so as to tilt the apparatus 10 and its catch basin 132 such that liquid collected in the catch basin 132 is directed toward a drain (not shown) located at one corner of the catch basin 132 so as to more effectively drain the catch basin 132 when the drain is opened. The controller 60 is also operable to re-stabilize the apparatus 10, after draining is completed, for further plant material processing.

In some embodiments, the controller 60 is additionally or alternatively operable to adjust the height of the drum 62, such as to adjust the gap between the drum 62 and the cutting reels 84. In such embodiments, the position of the threaded rod 100 or similar may be adjustable in response to commands issued by the controller 60.

Second Embodiment

Referring to FIGS. 21 to 36, the apparatus 10 is modified according to a second embodiment. For example, the apparatus 10 of the second embodiment typically does not include the cutting reel assembly 82 (FIGS. 9 and 10) of the first embodiment.

The apparatus 10 in the second embodiment includes the frame 12, enclosure 14, wheels 16, stabilizers 18, foot pads 20, and stabilizer motors 22, each of which is similar, if not identical, to the same-number components of the first embodiment.

The infeed end 26 and the outfeed end 28 of the second embodiment correspond to those of the first embodiment, respectively.

The apertures 158 of the second embodiment serve the same or analogous function as the outlet ducts 30 of the first embodiment. Although not shown in FIGS. 21 to 23 for ease of illustration, the apparatus 10 of the second embodiment typically includes outlet ducts 30.

Referring to FIGS. 24 to 27, the drum 62, slots 64, main body 66, drum motor 68, output shaft 70 of the drum motor 68, drum-motor pulley 72, drum belt 74, drum pulley 76, drum axle 78, drum hub 79, drum spokes 80, drum bracket 94, bracket slot 96, axle clamp 98, threaded rod 100, and bracket mount 102 of the second embodiment are each similar, if not identical, to the same-numbered components of the first embodiment, respectively. The range of possible sizes, including material thickness, and speeds of rotation of the drum 62 of the second embodiment is similar, if not identical, to that of the first embodiment.

Figure 28:
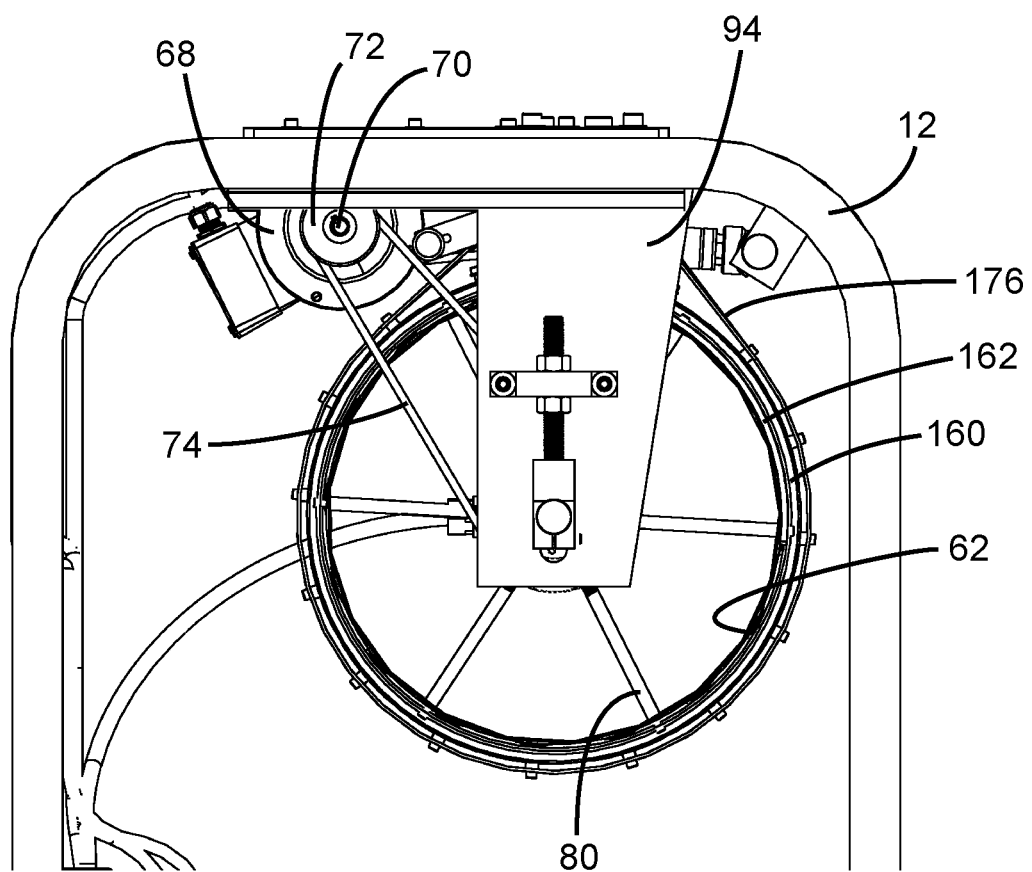
FIG. 28 is a side view of the second-embodiment apparatus shown in FIG. 21, showing a ring gap between a drum and a drum ring.
Figure 29:
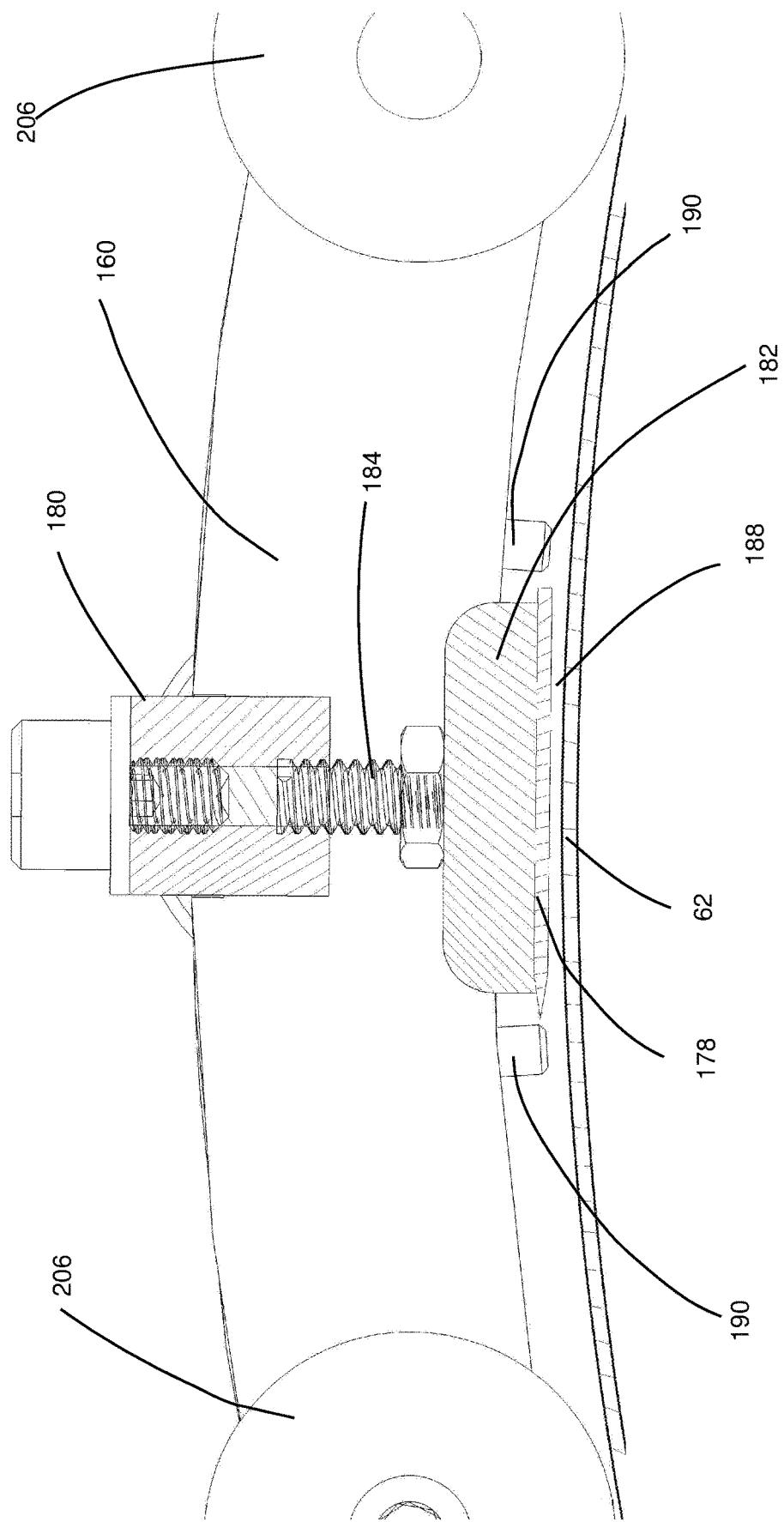
FIG. 29 is a close-up cross section view along line A-A of a portion of the ring in FIG. 34 but also showing the drum and showing the magnet, blade and ring gap in close-up view.

Referring to FIGS. 24 to 33, a pair of parallel, spaced-apart drum rings 160 are disposed at opposing ends of the drum 62. The diameter of the drum rings 160 is slightly larger than that of the drum 62 itself, and the drum rings 160 circumscribe the drum 62. As best seen in FIGS. 28 and 29, a ring gap 162 between the drum 62 and the drum rings 160 permits the drum rings 160 to rotate independently of the drum 62.

Figure 36:
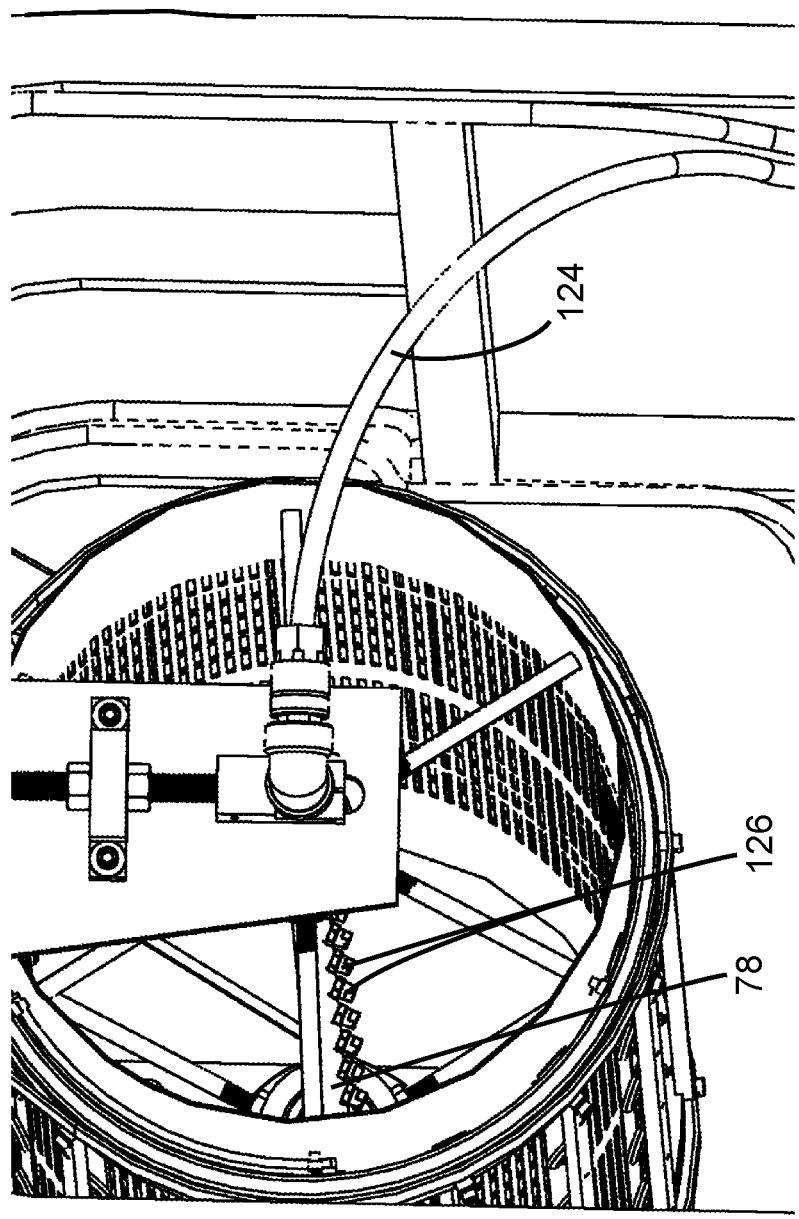
FIG. 36 is a close-up perspective view of a portion of the apparatus shown in FIG. 21, showing nozzles attached to a hollow axle inside the drum of the apparatus.
Figure 37:
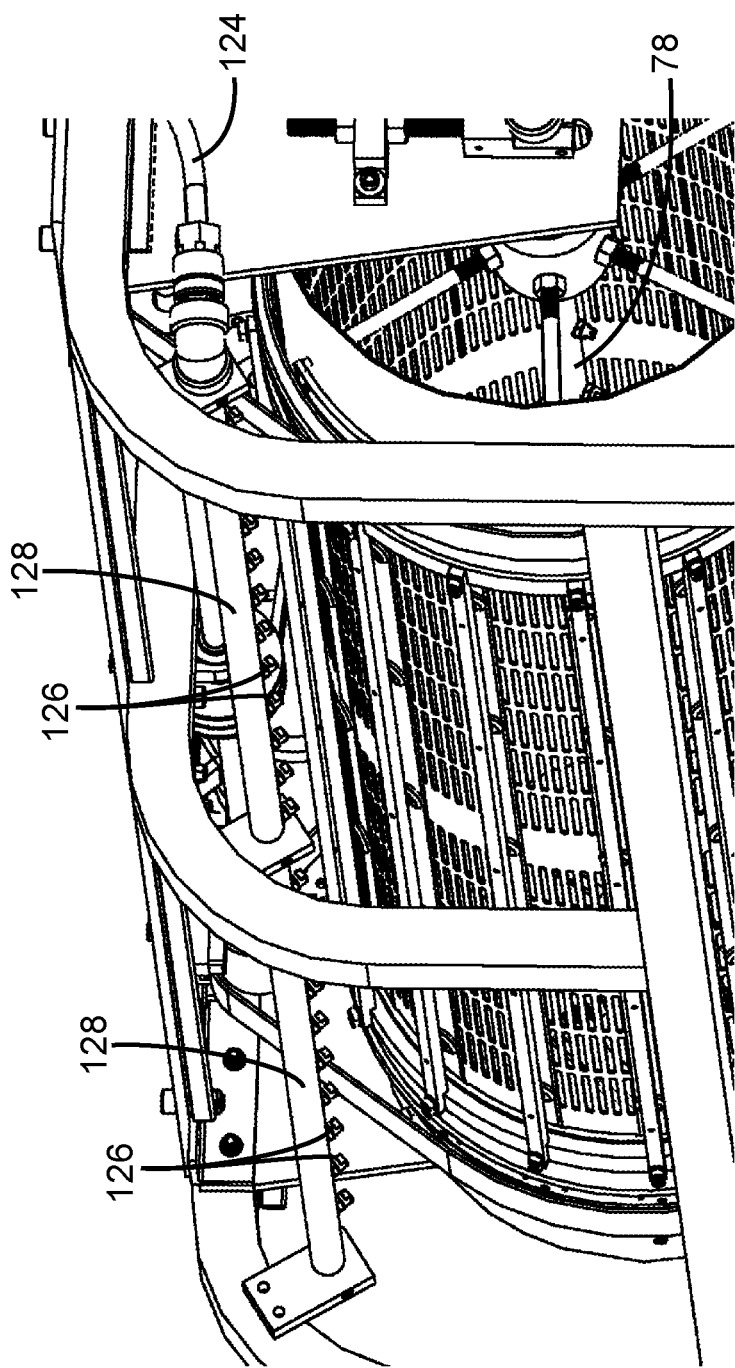
FIG. 37 is a close-up perspective view of a portion of the apparatus shown in FIG. 21, showing the spray tube positioned outside of the drum.

In the second embodiment, an annular bearing 164 may be disposed in the ring gap 162 between the drum 62 and each of the drum rings 160, thereby advantageously minimizing friction between the drum 62 and the drum ring 160 (as shown for example in FIGS. 28, 36, and 37). The annular bearing 164 is preferably made of PTFE (polytetrafluoroethylene), but in variations may be made of other self-lubricating plastic material or other composite materials.

In preferred embodiments of the second embodiment of the present invention, one or more roller bearing cam followers 206 (as shown for example in FIGS. 24, 25, 27, 29 and 34) are used instead of an annular bearing. The roller bearing cam followers 206 are connected to the drum rings 160 so as to roll upon the outer surface of the drum 62 to maintain the ring gap 162 between the drum ring 160 and the drum 62. Other roller-type bearings (not shown), or other bearings (not shown) may likewise be used to maintain the ring gap 162. Such bearings 164 may be attached to the drum ring 160 or the drum 62, for example.

Figure 24:
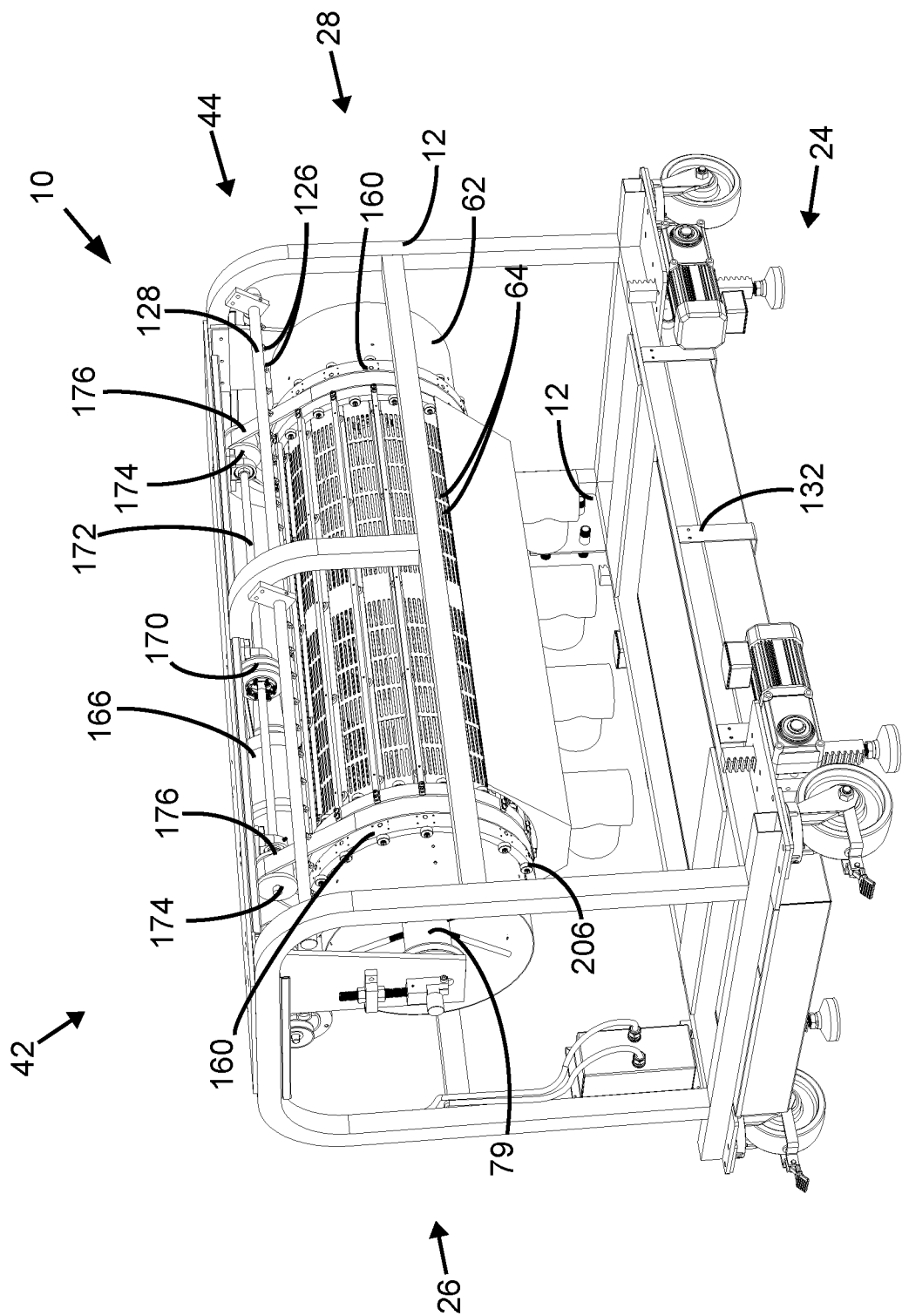
FIG. 24 is a perspective rear view of the second-embodiment apparatus shown in FIG. 21, showing internal components of the apparatus with its outer enclosure removed.
Figure 25:
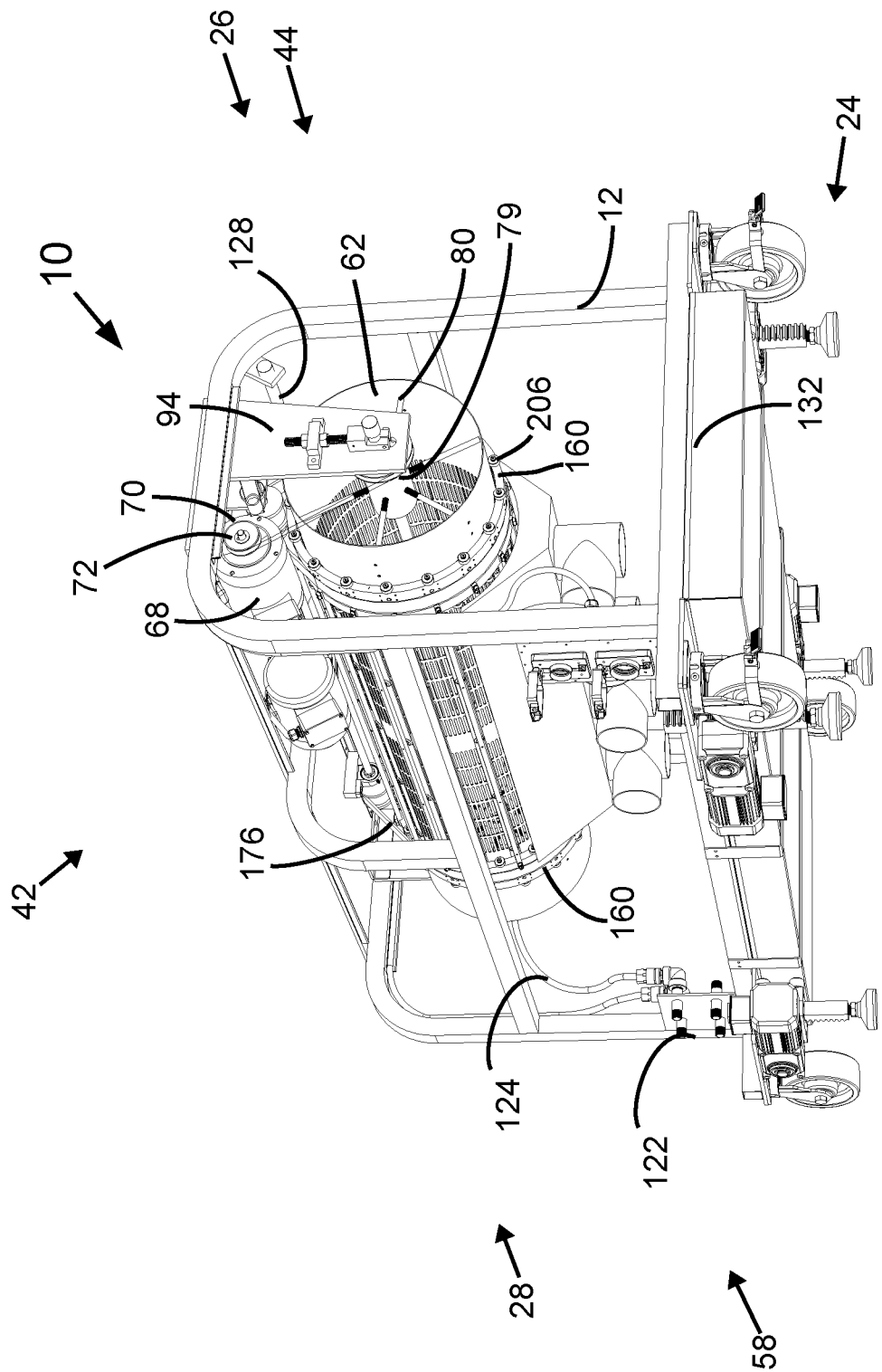
FIG. 25 is a perspective view of the second-embodiment apparatus shown in FIG. 21, showing internal components viewed from the infeed end and front side of the apparatus.
Figure 26:
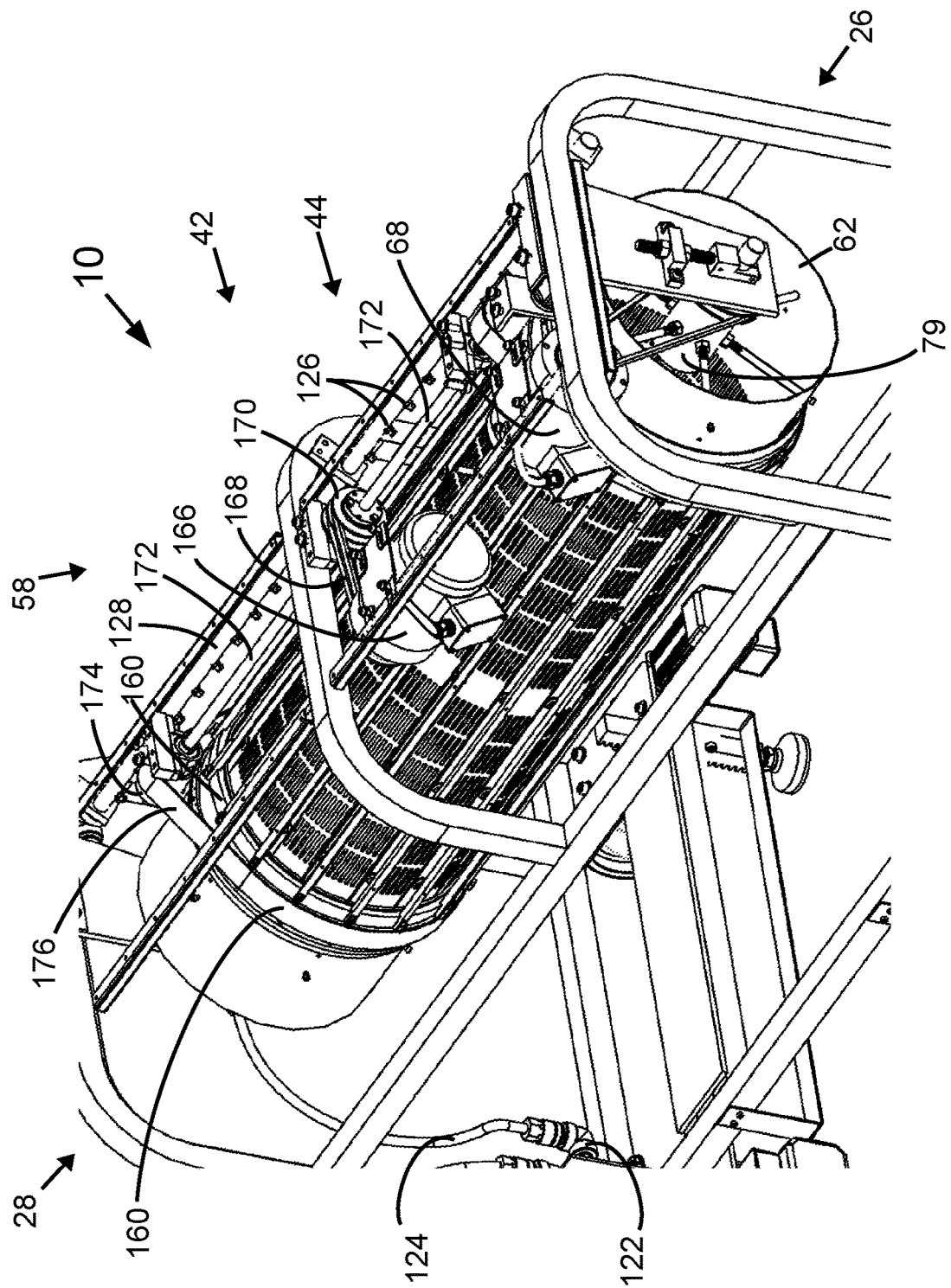
FIG. 26 is a perspective view of the second-embodiment apparatus shown in FIG. 21, showing internal components viewed from above the infeed end and front side of the apparatus.
Figure 27:
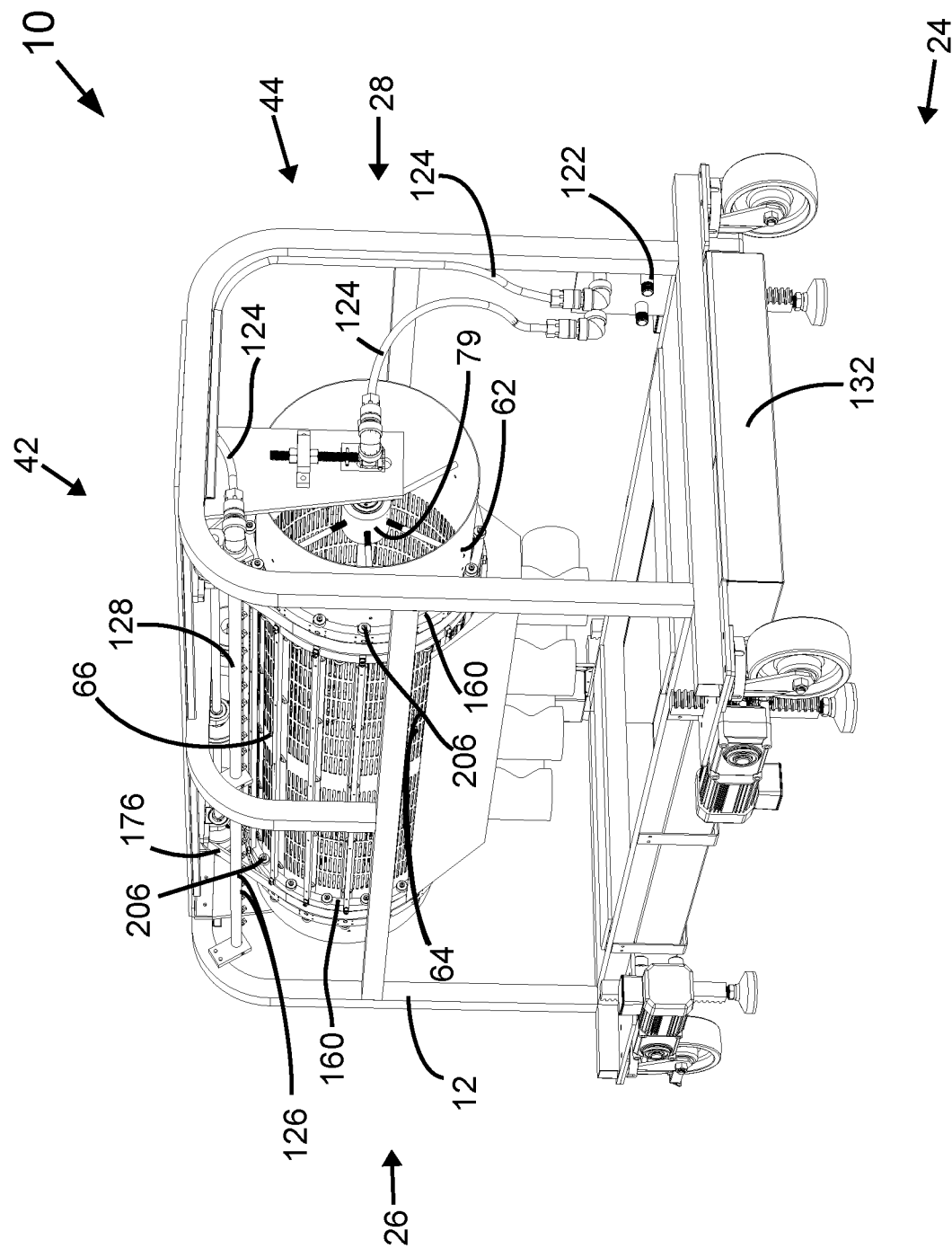
FIG. 27 is a perspective view of the second-embodiment apparatus shown in FIG. 21, showing internal components viewed from the outfeed end and rear side of the apparatus.

As best seen in FIGS. 24 to 26 according to the second embodiment, the drum rings 160 are rotationally driven by a ring motor 166 that drives a ring-motor belt 168 that in turn drives a ring-shaft pulley 170 attached to a ring shaft 172. Also attached to the ring shaft 172 are a pair of ring pulleys 174 aligned with the drum rings 160, respectively, at opposing ends of the drum 62. The ring pulleys 174 drive a pair of ring belts 176 that drive the drum rings 160.

While FIGS. 21 to 37 show one exemplary mechanism for driving the drum rings 160, variations thereof and other mechanisms for driving the drum rings 160 are possible. In variations of embodiments, the drum rings 160 may be roller-driven, gear-driven or otherwise driven by a cogged device (not shown), integrally motorized (such as the drum 62 and the drum ring 160 forming together a rotor and stator, in either order, of an electric motor), driven otherwise, or any combination thereof for example. Advantageously, the drum rings 160 can be rotated in either direction (e.g. either clockwise or counterclockwise) and at variable speeds. For example, the drum rings 160 can rotate as slowly as a few revolutions per minute (RPM) or as much as several hundred RPM. In the second embodiment, the drum rings 160 typically rotate in the range of 5 RPM to 200 RPM, for example. The exact rotation speed of the drum rings 160, in conjunction with setting the rotation speed of the drum 62 itself, is preferably set to the particular strain or type of plant material being processed and the desired trimming effect. In variations of uses, the controller 60 is operable to cause the drum 62 and the drum rings 160 to rotate in the same or opposite directions.

Figure 30:
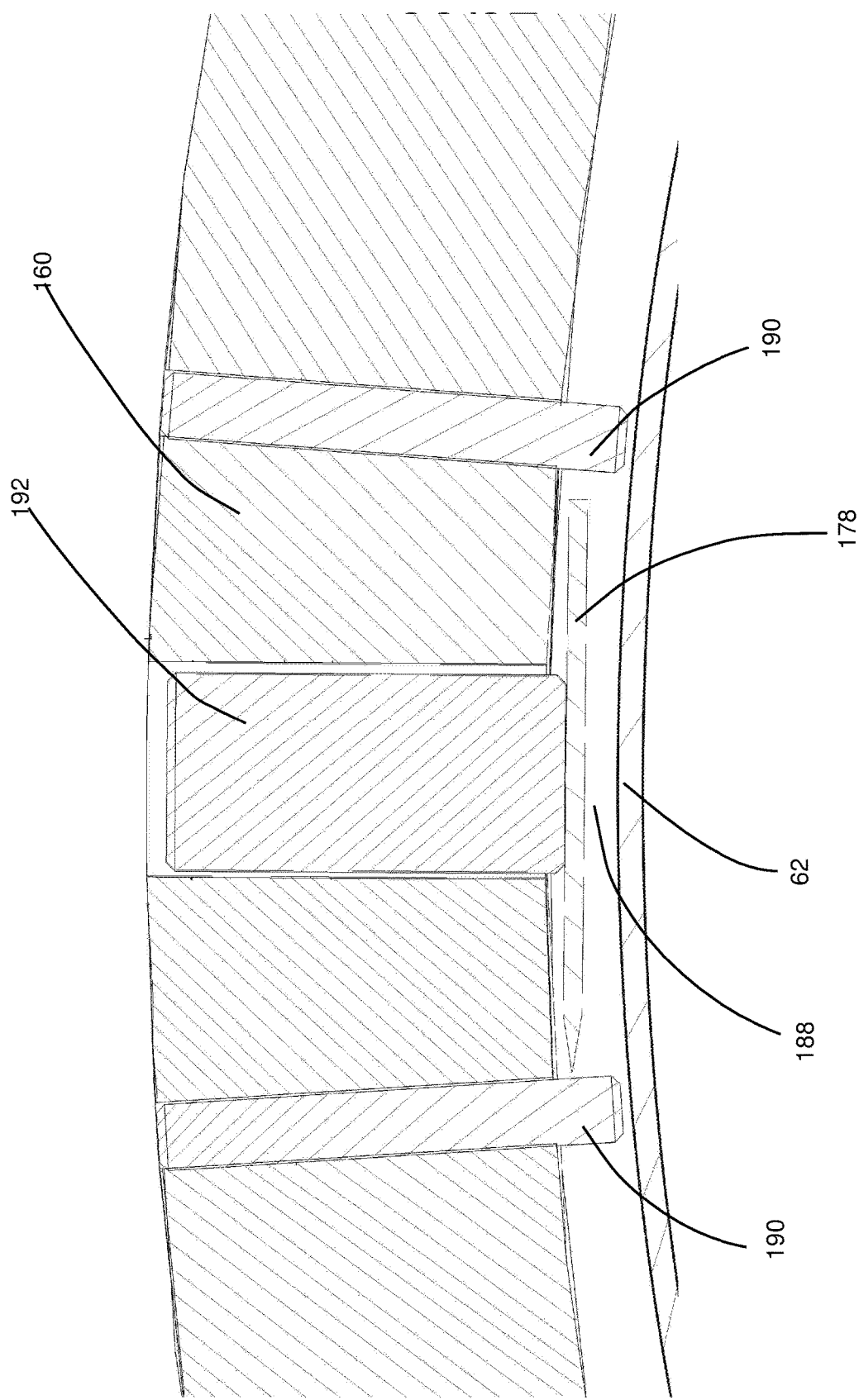
FIG. 30 is a close-up cross section view along line B-B of a portion of the ring in FIG. 34 but also showing the drum and showing the magnet, blade and ring gap in close-up view.
Figure 31:
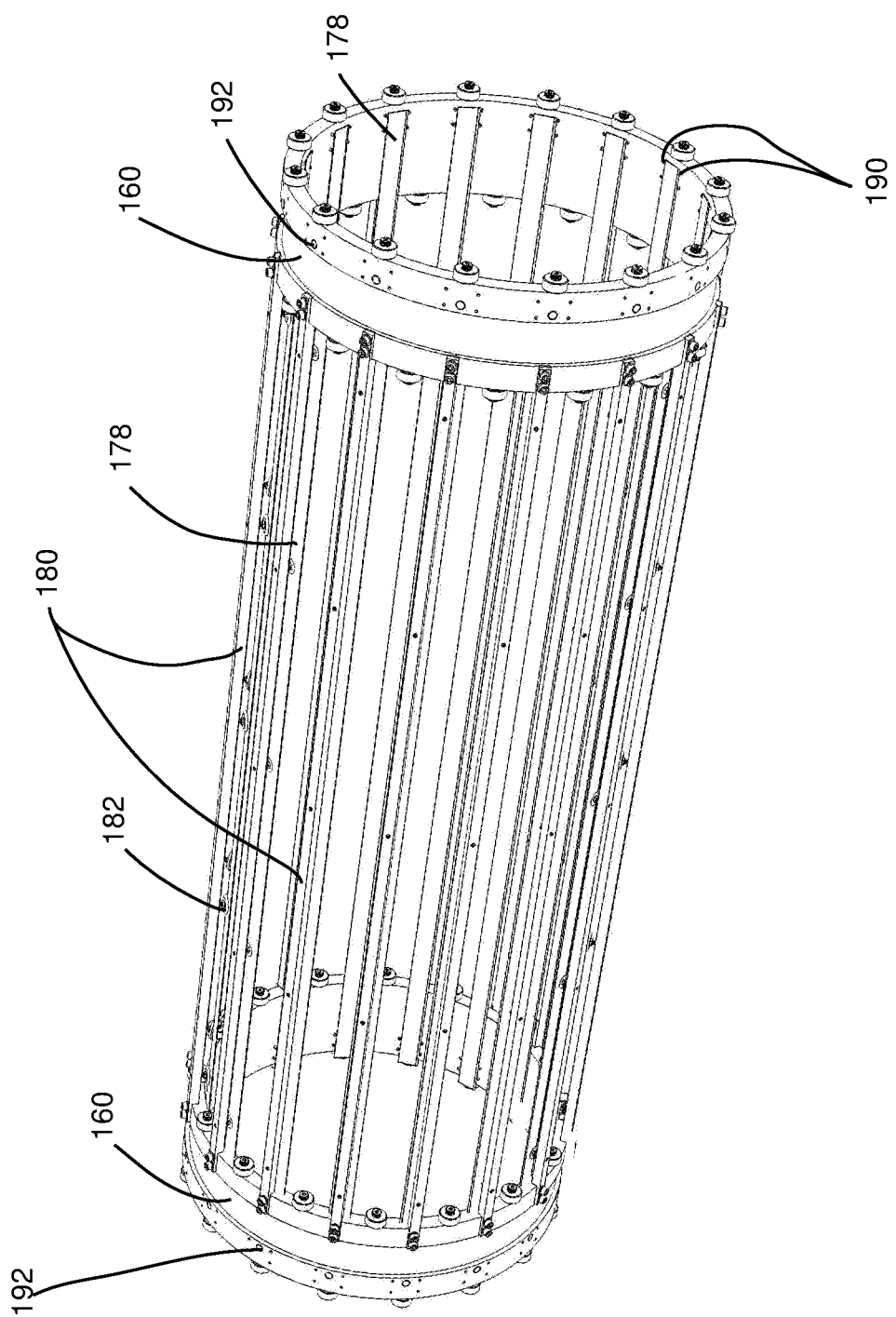
FIG. 31 is a perspective view of a portion of the second-embodiment apparatus shown in FIG. 21, showing a plurality of blades extending between a pair of drum rings.
Figure 32:
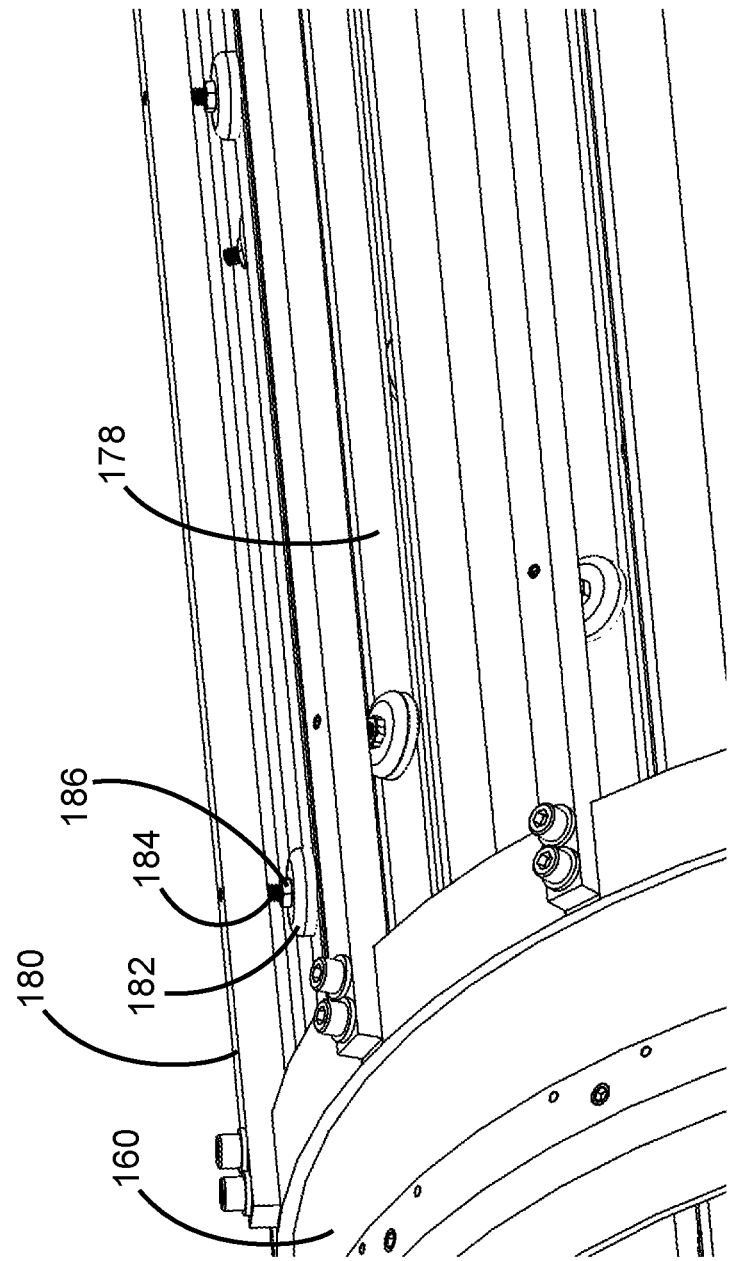
FIG. 32 is a close-up perspective view of a portion of the portion shown in FIG. 30, showing blades magnetically attached to rod magnets.
Figure 33:
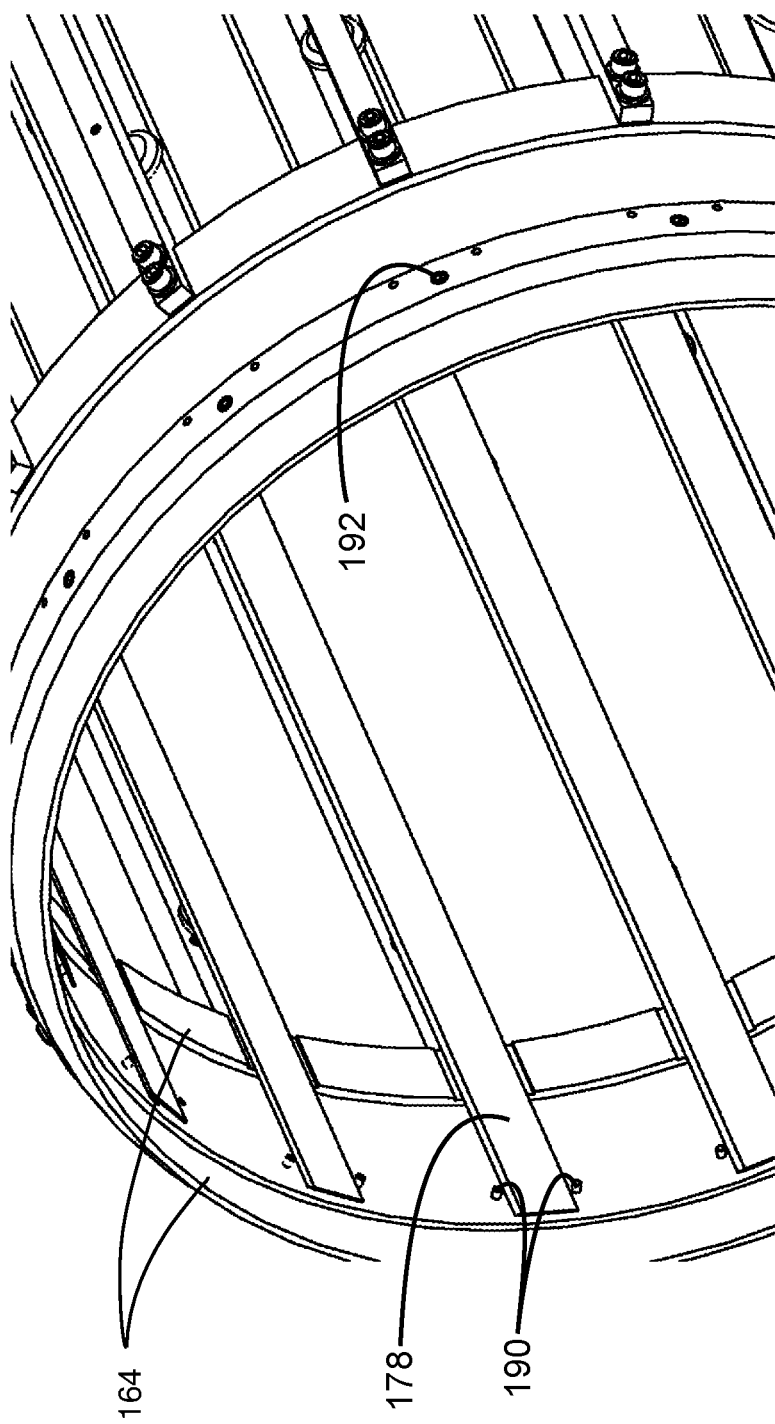
FIG. 33 is a perspective view of the portion shown in FIG. 30, showing the blades extending between positioning posts.

Referring particularly to FIG. 30, a plurality of parallel, spaced-apart elongate blades 178 extend between each of the drum rings 160. In the second embodiment, the blades 178 are distributed uniformly around circumference of the main body 66 of the drum 62, although other distributions are within the scope contemplated by the present invention.

The apparatus 10 includes one or more bars or rods 180, such as may be made of a rigid metallic material, extending between the drum rings 160. The rods 180 are mounted to the drum rings 160, such as at the outer surface of the drum rings 160.

Referring to FIGS. 29 to 30, at least a portion of at least one edge of each blade 178 is sharp-edged. In the second embodiment, each blade 178 is sharp-edged fully along one edge and dull-edged fully along the opposing edge of the blade 178. In other embodiments, a portion of one edge of each blade 178 is dull-edged while another portion of the one edge of each blade 178 is sharp-edged.

Variability in blade 178 sharpness advantageously provides multiple trimming effects.

For embodiments in which the blades 178 are sharp on one edge and dull on the other edge, the drum rings 160 may be initially rotated in a direction such that the dull edges of the blades 178 are the leading edges, thereby initially trapping and removing larger plant matter (e.g. leaves) from the plant material. Thereafter, the direction of rotation of the drum rings 160 may be reversed such that the sharp edges become the leading edges, thereby providing a cleaner trim and a better finished appearance to the plant material exiting the drum 62.

For embodiments in which the blade 178 portions that are proximate to the infeed end 26 of the apparatus 10 are dull and the blade 178 portions proximate the outfeed end 28 are sharp, plant material is inserted into the apparatus 10 at the infeed end 26. The apparatus 10 is then operated such that the variable sharpness edges of the blades 178 are leading edges. The inserted plant material is initially subjected to a coarser trim near the infeed end 26, and then the coarsely trimmed plant material is subjected to a finer trim near the outfeed end 28 before exiting the apparatus 10 fully trimmed. In some embodiments, the sharpness of the edges along one or both edges of the blades 178 is varied continuously or in multiple steps, such as from maximally dull at the infeed end 26 to being maximally sharp at the outfeed end 28.

In some embodiments, at least a portion of one or more blades 178 is coated to produce a dull edge. In such embodiments, the coating may be made of a material that facilitates trapping plant matter between the blades 178 and the outer, slotted surface of the main body 66 of the drum 62.

In some embodiments, the portions of the blade 178 edges that are dull are a different distance from the main body 66 of the drum 62 than the blade 178 edges that are sharp. For example, duller edges may be further from the drum 62 than sharper edges, advantageously providing a greater variation of trimming effects. Such different distances may be achieved by employing twisted blades 178, blades 178 having twisted portions, angling of the blades 178 relative to the drum rings 160, other techniques, or any combination thereof for example.

A coarser initial trim advantageously better preserves the removed plant matter for other uses.

In variations of embodiments, any number of drum rings 160, and corresponding ring pulleys 174 may be employed. The blades 178 are made of metal but could conceivably be made from other suitable material or combination thereof.

Still referring to FIGS. 29 to 33, rod magnets 182 are attached to the rods 180 to facilitate holding the blades 178 in place adjacent to, but preferably not contacting, the drum 62. In the second embodiment, the rod magnets include threaded rods 184 dimensioned to extend through corresponding apertures in the rods 180. Adjustment nuts 186 on the threaded rods 184 permit adjustment of the distance that the rod magnets 182 project from the rods 180 toward the drum 62, thereby adjusting the blade gap 188 (best seen in FIG. 33) between the blades and the drum 62. When the blades 178 are being held in place by the rod magnets 182, each blade 178 extends beneath the drum rings 160 between a pair of positioning posts 190 and are further secured to the drum rings 160 by ring magnets 192 that each extend through the drum rings 160 between a corresponding pair of positioning posts 190. Thus, the apparatus 10 of the second embodiment is advantageously operable to removably attach the blades 178 to the drum rings 160. In the second embodiment, each blade 178 is removable simply by pulling it away from one or more rod magnets 182 so as to slide the blade 178 away from the ring magnet 192 at each end of the drum 62. Inserting the blade 178 is simply a matter of positioning it within the magnetic field of the rod magnets 182 and ring magnets 192 associated with one rod 180.

While FIGS. 30 to 33 show one method of removably attaching the blades 178 to the drum rings 160, in general any suitable method may be employed. In variations, the blades 178 can be permanently, indefinitely or removably attached to the drum rings 160 by fasteners, snap positioning, magnetism, friction, other attachment techniques, or any combination thereof for example.

Referring back to FIG. 28, the apparatus 10 according to the second embodiment includes the adjustment mechanism, described herein above in respect of the first embodiment, for adjusting the height of the drum 62, such as by including the drum brackets 94 and their associated components 96 to 102.

The apparatus 10 in accordance with the second embodiment includes the vacuum sub-system 46 described herein above in respect of the first embodiment. In the second embodiment, the vacuum sub-system 46 may be suitably employed to urge the movement of plant matter past the blades 178 and/or urge the exit of removed plant matter via the apertures 158, for example. The apparatus 10 according to a variation of the second embodiment includes an internal shroud (not shown) enclosing all or a portion of the drum 62, the drum rings 160 and the blades 178, thereby facilitating the exit of plant material from the drum 62 via the slots 64. Plant matter that is removed by the blades 178 would continue to experience suction from the vacuum sub-system 46 until being separated from the vacuum-induced air flow (typically prior to or otherwise without reaching the vacuum source itself) and collected into a collector such as the separator bin 52.

Referring back to FIG. 20, the apparatus 10 according to the second embodiment includes the controller 60, and its CPU 154 and memory 156, generally as described above in respect of the first embodiment. Controlling the respective operations of the feeding sub-system 34, drum sub-system 42, the cutting sub-system 44, and the vacuum sub-system 46 by the controller 60 advantageously facilitates additional trimming effects. For example, a traveling wave effect may be created.

Figure 34:
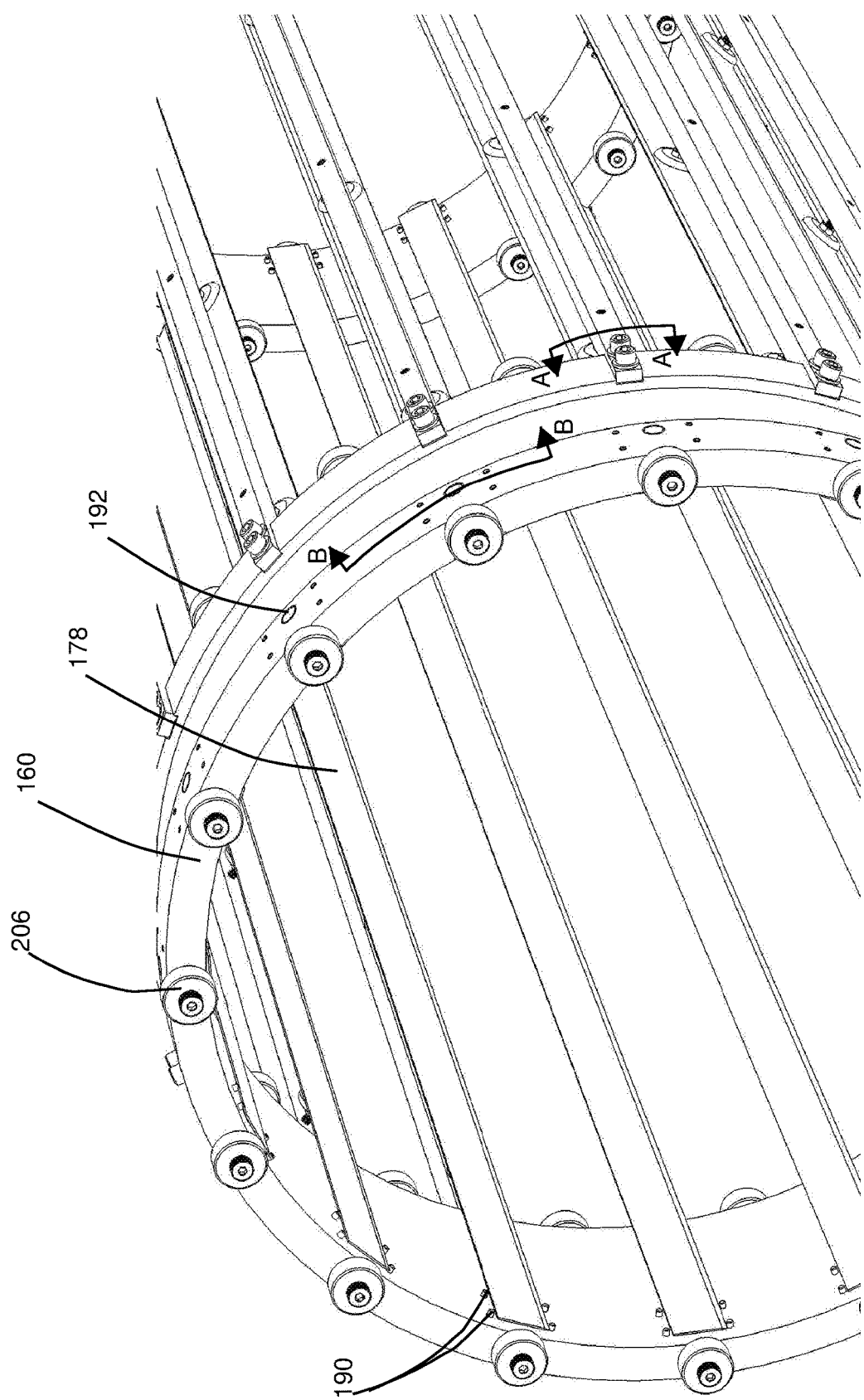
FIG. 34 is a close-up perspective of a portion of the apparatus shown in FIG. 24, showing roller bearing cam followers, a ring gap between the drum and the blades.

Referring to FIG. 34, the memory 156 in accordance with embodiments of the invention contains blocks of code comprising computer executable instructions for directing the CPU 154 to perform the steps of a method shown generally at 194. Additionally or alternatively, such blocks of code may form part of a computer program product comprising computer executable instructions embodied in a signal bearing medium, which may be a recordable computer readable medium or a signal transmission type medium, for example.

When electrical power is being supplied to the CPU 154 and the memory 156, the CPU 154 is directed to begin executing the instructions of block 196. Block 196 then directs the CPU 154 to control the vacuum sub-system 46 so as to set the vacuum suction occurring at the infeed end 26 portion of the drum 62 to high suction, and to set the vacuum suction occurring at the outfeed end 28 portion of the drum 62 to low suction. Thus, the vacuum suction at the infeed end 26 becomes higher than that at the outfeed end 28. For example, the vacuum suction at the infeed end 26 may be maximized and the vacuum suction at the outfeed end 28 is not maximized, minimized or turned off completely. Executing block 196 advantageously facilitates drawing in new plant material from the feeding sub-system 34 into the infeed end 26 portion of the drum 62. During this first phase, the lower vacuum suction at the outfeed end 28 portion of the drum 62 advantageously facilitates maintaining the newly entered plant material near the infeed end 26. Executing block 196 is particularly advantageous for embodiments in which the blades 178 at the infeed end 26 are relatively dull to give a pulling effect that removes large leaves from the plant material.

After block 196 has been executed, block 198 then directs the CPU 154 to process plant material (e.g. for large-leaf removal at the infeed end 26) for a first specifiable duration of time, such as several minutes. Processing plant material typically involves setting and maintaining the state of the drum sub-system 42 to rotate the drum 62 at a specifiable speed, setting and maintaining the state of the cutting sub-system 44 to rotate the blades 178 at a specifiable speed, and maintaining the state of the vacuum sub-system 46 as set by block 196.

At the conclusion of the first duration, block 200 directs the CPU 154 to control the vacuum sub-system 46 so as to set the vacuum suction occurring at the infeed end 26 portion of the drum 62 to low suction, and to set the vacuum suction occurring at the outfeed end 28 portion of the drum 62 to high suction. Thus, the vacuum suction at the infeed end 26 becomes lower than that at the outfeed end 28. For example, the vacuum suction at the infeed end 26 may be reduced from maximum, minimized or turned off completely and the vacuum suction at the outfeed end 28 can be increased and in some cases even maximized. Executing block 200 advantageously facilitates moving plant material from the infeed end 26 portion of the drum 62 toward the outfeed end 28 portion of the drum 62. Executing block 200 is particularly advantageous for embodiments in which the blades 178 at the outfeed end 28 are relatively sharpened to give a sharp cutting effect that finely cuts away small portions of the plant material.

After block 200 has been executed, block 202 then directs the CPU 154 to process plant material (e.g. for sharp cutting at the outfeed end 28) for a second specifiable duration of time, such as several minutes. Processing plant material typically involves setting and maintaining the state of the drum sub-system 42 to rotate the drum 62 at a specifiable speed equal to or different from that employed by block 198, setting and maintaining the state of the cutting sub-system 44 to rotate the blades 178 at a specifiable speed equal to or different from that employed by block 198, and maintaining the state of the vacuum sub-system 46 as set by block 200.

Block 204 directs the CPU 154 to determine whether to continue the process of method 194 by returning to execute block 196, in which case further new plant material would be encouraged to enter into the drum 62 at the infeed end 26 in response to the higher vacuum suction at the infeed end 26, while not preventing or facilitating the exit of fully processed plant material from the drum 62 at the outfeed end 28 in response to lower vacuum suction at the outfeed end 28.

If it is determined by the CPU 154 to continue, then the process returns to block 196. Determining whether to continue may involve receiving a signal from the feeding sub-system 34, measuring a quantity of plant material remaining in the hopper 36, determining whether the hopper 36 is currently activated, receiving user input, not receiving new user input, retrieving a stored user input value from the memory 156, other steps for determining whether to continue processing plant material, or any combination thereof for example.

If by block 204 the CPU 154 determines to not continue, then method 194 ends. Ending method 194 may involve lowering or eliminating vacuum suction at both the infeed and outfeed ends 26 and 28 so as to facilitate any processed plant material remaining in the drum 62 to exit the drum 62 via its outfeed end 28.

In some embodiments, the block 204 is optional and blocks 196 to 202 are continually repeated as long as electrical power is supplied to the CPU 154 and the memory 156 for example. In some embodiments, receiving user input to end the method 194 immediately interrupts the process and ends the method 194.

Figure 35:
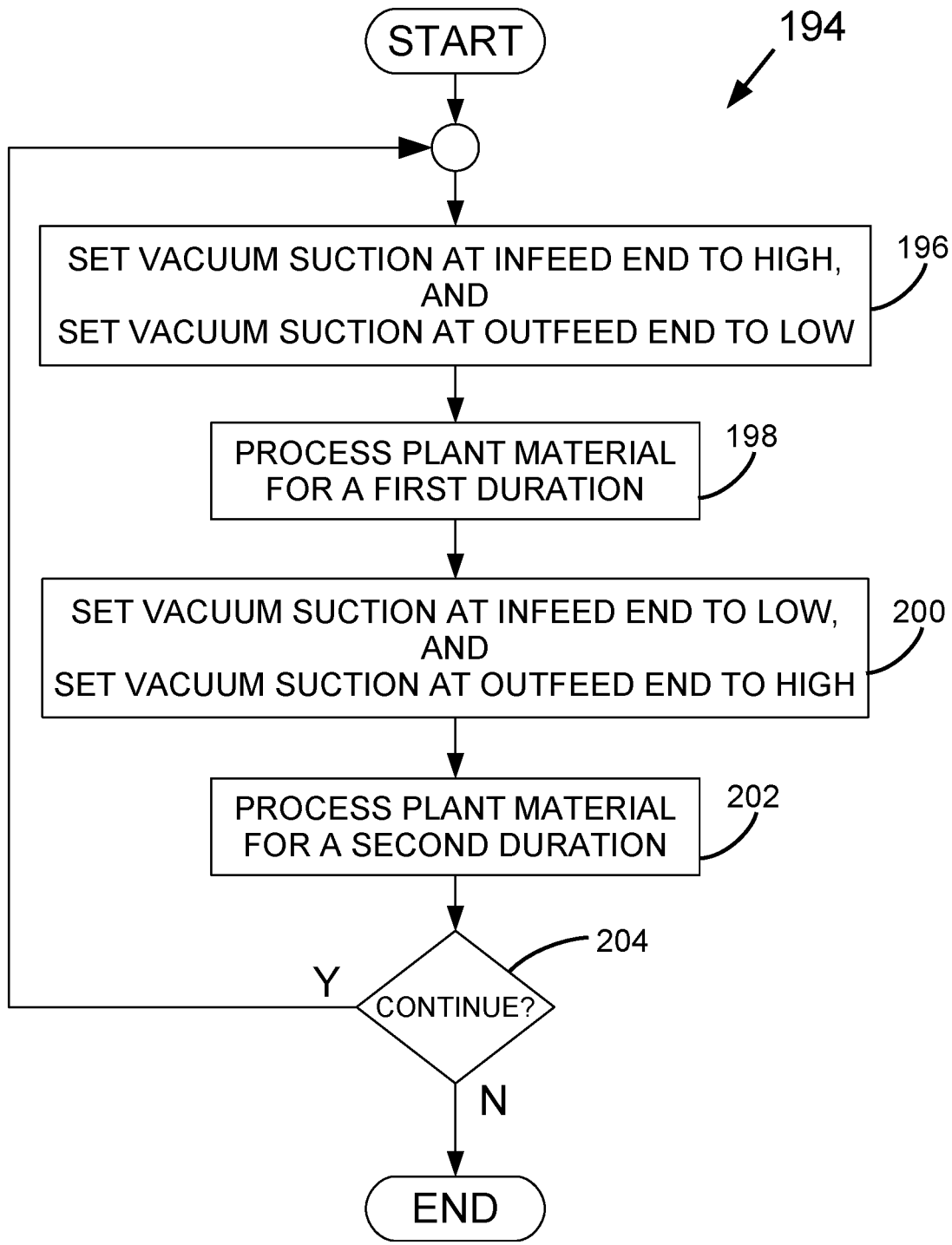
FIG. 35 is a flowchart of a method of processing plant material by the apparatus shown in FIG. 21, showing processing for a first duration and then for a second duration.

Referring to FIG. 20 and FIGS. 35 to 36, the apparatus 10 according to the second embodiment includes the self-cleaning sub-system 58. The apparatus 10 of the second embodiment includes the hollow drum axle 78 having nozzles 126 (FIGS. 13 and 35) and the spray tube 128 (FIGS. 14 and 36) having nozzles 126.

In some embodiments, including possibly the first and/or second embodiments, various components of the apparatus 10 are advantageously certified as food grade or otherwise in compliance with food grade specifications. In such embodiments, the food grade components may include any components coming into contact with the plant material, such as the drum 62, cutting reels 84, blades 178, self-cleaning sub-system 58 components, inside surface of the enclosure 14, other components, or any combination thereof for example.

Thus, there is provided an apparatus for processing plant material, the apparatus having an enclosure attached to a frame, the apparatus comprising: (a) a cylindrical rotatable drum for receiving the plant material, the rotatable drum having a plurality of slots; (b) a cutting module for cutting portions of the plant material that pass through one or more of the slots; and (c) a plurality of nozzles for ejecting a liquid within the enclosure.

While embodiments of the invention have been described and illustrated, such embodiments should be considered illustrative of the invention only. The invention may include variants not described or illustrated herein in detail. Thus, the embodiments described and illustrated herein should not be considered to limit the invention as construed in accordance with the accompanying claims.

What is claimed is:

1. An apparatus for processing plant material, the apparatus having an enclosure attached to a frame, the apparatus comprising:
   (a) a cylindrical rotatable drum for receiving the plant material, the rotatable drum having a plurality of slots; and
   (b) a cutting module comprising a plurality of blades rotatable about the rotatable drum for cutting portions of the plant material that pass through one or more said slots, wherein the cutting module and the rotatable drum are coaxial.

2. The apparatus of claim 1 further comprising a pair of parallel, spaced-apart rings circumscribing the rotatable drum, the plurality of blades being removably attachable to the pair of rings by a plurality of ring magnets.

3. The apparatus of claim 2 further comprising a plurality of rods extending between the pair of rings, each said blade being removably attachable to a corresponding said rod by at least one rod magnet.

4. The apparatus of claim 1 further comprising a plurality of nozzles operable to eject liquid from within the rotatable drum.

5. The apparatus of claim 4 wherein the plurality of nozzles are further operable to eject the liquid toward the rotatable drum from outside of the rotatable drum.

6. The apparatus of claim 4 wherein the rotatable drum comprises an axle that is hollow and is in communication with a source of liquid, and the plurality of nozzles are on the axle and operable to eject liquid from the axle onto an inside surface of the rotatable drum.

7. The apparatus of claim 1 wherein the cutting module comprises a pair of parallel spaced-apart rings circumscribing the rotatable drum and the plurality of blades extend between the pair of parallel spaced-apart rings.

8. The apparatus of claim 7 wherein the cutting module further comprises a plurality of rods extending between the pair of parallel spaced-apart rings, each blade of the plurality of blades being removably attachable to a corresponding rod of the plurality of rods.

9. The apparatus of claim 8 wherein the plurality of blades are removably attachable to the pair of parallel spaced-apart rings and to the corresponding plurality of rods by a plurality of magnets.

10. The apparatus of claim 7 further comprising a low friction annular bearing between each ring of the pair of parallel spaced-apart rings and the rotatable drum to minimize friction between the rotatable drum and the pair of parallel spaced-apart rings.

11. The apparatus of claim 7 further comprising roller bearing cam followers between each ring of the pair of parallel spaced-apart rings and the rotatable drum to facilitate rotation of the pair of parallel spaced-apart rings relative to the rotatable drum.

12. The apparatus of claim 11 wherein the roller bearing cam followers are connected to the pair of parallel spaced-apart rings and roll upon an outer surface of the rotatable drum.

13. The apparatus of claim 7 wherein the plurality of blades are removably attachable to the pair of parallel spaced-apart rings.

14. The apparatus of claim 13 wherein the plurality of blades are removably attachable to the pair of parallel spaced-apart rings by a plurality of magnets.

15. The apparatus of claim 1 further comprising a first motor to rotate the rotatable drum and a second motor to rotate the cutting module about the rotatable drum thereby enabling the rotatable drum and the cutting module to rotate at different speeds or in different directions relative to one another.

16. The apparatus of claim 15 further comprising a controller operable to control the first motor and operable to control the second motor.

\* \* \* \* \*